United States Patent
Gorur Sheshagiri et al.

(10) Patent No.: US 10,767,997 B1
(45) Date of Patent: Sep. 8, 2020

(54) SYSTEMS AND METHODS FOR PROVIDING IMMERSIVE EXTENDED REALITY EXPERIENCES ON MOVING PLATFORMS

(71) Applicant: QUALCOMM Incorporated, San Diego, CA (US)

(72) Inventors: Pushkar Gorur Sheshagiri, Bengaluru (IN); Chayan Sharma, Jabalpur (IN); Chiranjib Choudhuri, Bangalore (IN); Ajit Deepak Gupte, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/284,766

(22) Filed: Feb. 25, 2019

(51) Int. Cl.
*G01C 21/20* (2006.01)
*G06T 7/11* (2017.01)
(Continued)

(52) U.S. Cl.
CPC ............. *G01C 21/20* (2013.01); *G06F 1/163* (2013.01); *G06N 3/02* (2013.01); *G06T 7/11* (2017.01); *G06T 19/006* (2013.01)

(58) Field of Classification Search
CPC ......... G01C 21/20; G01C 21/005; G06T 7/11; G06T 19/006; G06T 7/73; G06T 19/20;
(Continued)

(56) References Cited

U.S. PATENT DOCUMENTS 9,245,387 B2   1/2016 Poulos et al.
9,766,075 B2   9/2017 Foxlin et al.
(Continued)

FOREIGN PATENT DOCUMENTS

EP   3396631 A1   10/2018
WO   0180736 A1   11/2001
WO   2015155029 A1   10/2015

OTHER PUBLICATIONS

Foxlin E., "Head-tracking Relative to a Moving Vehicle or Simulator Platform Using Differential Inertial Sensors", proceedings of SPIE/ IS &T, vol. 4021, Apr. 24, 2000 (Apr. 24, 2000), pp. 133-144, XP008029663, DOI: 10.1117/12.389141, ISBN: 978-1-62841-730-2, the whole document.

(Continued)

*Primary Examiner* — Xilin Guo
(74) *Attorney, Agent, or Firm* — QUALCOMM Incorporated

(57) ABSTRACT

Systems, methods, and computer-readable media are provided for immersive extended reality experiences on mobile platforms. In some examples, a method can include obtaining sensor measurements from one or more sensors on a mobile platform and/or a device associated with a user in the mobile platform, the sensor measurements including motion parameters associated with the mobile platform and the user; identifying features of the mobile platform and an environment outside of the mobile platform; tracking, using the sensor measurements, a first pose of the mobile platform relative to the environment outside of the mobile platform; tracking, using the sensor measurements, a second pose of the user relative to at least one of the features of the mobile platform; and tracking, based on the first pose and the second pose, a third pose of the user relative to at least one of the features of the environment outside of the mobile platform.

30 Claims, 15 Drawing Sheets

(51) Int. Cl.
  *G06F 1/16*    (2006.01)
  *G06T 19/00*   (2011.01)
  *G06N 3/02*    (2006.01)

(58) Field of Classification Search
  CPC . G06T 15/10; G06T 7/75; G06F 1/163; G06F 11/3438; G06N 3/02
  See application file for complete search history.

(56) References Cited

U.S. PATENT DOCUMENTS

| | | | |
|---|---|---|---|
| 2014/0134992 A1* | 5/2014 | Ludick | G06K 9/00832 |
| | | | 455/418 |
| 2017/0094245 A1 | 3/2017 | Barakat et al. | |
| 2017/0115730 A1 | 4/2017 | Knebel et al. | |
| 2017/0178359 A1 | 6/2017 | Spiessl et al. | |
| 2018/0225875 A1* | 8/2018 | Yasrebi | B60R 11/04 |
| 2019/0004598 A1 | 1/2019 | Gordt et al. | |
| 2019/0041979 A1* | 2/2019 | Kirchner | G01P 15/08 |
| 2020/0073520 A1* | 3/2020 | Mohan | G06F 3/0482 |

OTHER PUBLICATIONS

International Search Report and Written Opinion—PCT/US2020/019339—ISA/EPO—May 19, 2020 (185216WO).

* cited by examiner

US 10,767,997 B1

SYSTEMS AND METHODS FOR PROVIDING IMMERSIVE EXTENDED REALITY EXPERIENCES ON MOVING PLATFORMS

TECHNICAL FIELD

The present disclosure generally relates to techniques and systems for providing extended reality experiences on moving platforms.

BACKGROUND

Extended reality technologies can combine real environments from the physical world and virtual environments or content to provide users with extended reality experiences. The extended reality experiences allow users to interact with a real or physical environment enhanced or augmented with virtual content and vice versa. More recently, extended reality technologies have been implemented to enhance user experiences in a wide range of contexts, such as healthcare, retail, education, social media, entertainment, and so forth.

The term extended reality (XR) can encompass augmented reality (AR), virtual reality (VR), mixed reality (MR), and the like. Each of these forms of XR allows users to experience or interact with immersive virtual environments or content. To provide realistic XR experiences, XR technologies generally aim to integrate virtual content with the physical world. This typically involves generating a map of the real-world environment and calculating a particular point of view or pose relative to the map of the real-world environment in order to anchor virtual content to the real-world environment in a convincing manner. The point of view or pose information can be used to match virtual content with the user's perceived motion and the spatio-temporal state of the real-world environment.

BRIEF SUMMARY

In some examples, systems, methods, and computer-readable media are described for providing immersive extended reality experiences on moving platforms. Extended reality (XR) technologies can combine real or physical environments and virtual environments (and/or virtual content) to provide users with extended reality experiences (e.g., virtual reality, augmented reality, mixed reality, etc.). In use cases where a user is within a mobile platform (e.g., a vehicle, an elevator, a train, a conveyor belt, a vessel, an aircraft, a boat, a skateboard, a bicycle, a scooter, a conveyance, etc.) that moves relative to an external environment or scene, the technologies herein can provide virtual content that matches the perceived motion (e.g., due to inertial forces) of the user in the mobile platform. The virtual content can be anchored within the mobile platform (and/or a mobile map of the mobile platform) or the external scene (and/or a global map of the external scene) in a manner that accounts for the relative motion of the user, the mobile platform, and external scene. To match the virtual content with the perceived motion of the user, features such as motion and pose can be tracked for the mobile platform, the user, and/or the external scene.

However, feature tracking in mobile platforms can result in drift or artifacts due to the use of features within the mobile platform and features that are visible outside of the mobile platform. For example, when anchoring on object relative to a road sign visible through a window of a moving car, the motion of the user within the car (e.g., which can result from head movements, posture changes, etc.) and the relative movement of other features based on the trajectory of the car (e.g., the global motion of the car) can create inconsistent results (and errors) in the XR experience. This can be especially frustrating in scenes where the mobile platform is moving at a high rate of speed, which can result in increasingly inconsistent or misaligned XR experiences.

To accurately match the virtual content with the perceived motion of the user and limit or eliminate any errors and inconsistencies in the XR experience, the technologies herein can track the pose of a user within the mobile platform (e.g., relative to the mobile platform and/or the external scene), which can be represented by a mobile map or local motion map, and the pose of the mobile platform relative to the external scene, which can be represented by a global or world map. The user's pose relative to the global map can be transposed while disregarding internal mobile platform features to improve external and internal XR experiences. A synthesis or rendering engine used to display and/or render the virtual content can execute on an independent clock query for the user's pose for greater accuracy.

To track features (e.g., pose, motion dynamics, environment features, objects, view characteristics, etc.) within the mobile platform and features outside the mobile platform (e.g., features associated with the external scene), the technologies herein can implement various sensors and devices, such as inertial measurement units (IMUs), image sensors or camera sensors, LIDARs, radars, global positioning system (GPS) devices, etc., to collect feature measurements. Sensors can be implemented on the mobile platform, a wearable module such as an HMD (head-mounted display), and/or non-wearable modules in the mobile platform. Local motion (e.g., user pose) can be tracked using IMUs, which can compute high rate pose information (e.g., at a frequency of 1 khz). For example, local motion can be tracked via an HMD (head-mounted display) having one or more sensors (e.g., an IMU, a camera, etc.) or non-wearable modules (e.g., passive/active depth sensing systems mounted inside the mobile platform such as the cabin of a car). For HMD solutions, the XR experience can be provided through the HMD worn by a user, and a synthesis engine can transpose the user's pose relative to the global map, which can be triggered based on an environment classifier.

One or more sensors (e.g., IMUs, image sensors, radars, light emitters (e.g., lasers), etc.) can be implemented to measure motion with respect to an external scene (e.g., the global map). The one or more sensors can measure acceleration with respect to an inertial frame of reference (e.g., the global map). Since relying on the measured acceleration with respect to the inertial frame of reference without also accounting for acceleration of the mobile platform (e.g., an accelerating frame of reference, in this case corresponding to the mobile map) can lead to errors and inconsistencies, the technologies herein can implement one or more additional sensors (e.g., IMUs, image sensor(s), etc.) on the mobile platform to measure the acceleration of the mobile platform (e.g., the accelerating frame of reference or mobile map) with respect to the global map (e.g., the inertial frame of reference). The data from the one or more sensors measuring acceleration with respect to an inertial frame of reference (e.g., the global map) and the one or more additional sensors measuring the acceleration of the mobile platform (e.g., the accelerating frame of reference or mobile map) with respect to the global map (e.g., the inertial frame of reference) can be combined to estimate the user's pose. Since some sensors can drift over time, an image sensor can be implemented to capture image data used to provide feedback. The image sensor feedback can be used to adjust sensor biases in the system and correct the drift.

To estimate and track pose information, a tracking filter or model, such as a Kalman filter or an extended Kalman filter (EKF), can be implemented. The tracking filter or model can use measurements from one or more of the sensors to generate state estimates and error covariances (e.g., tracks) for one or more targets. For example, a tracking filter can estimate the relative velocity, position, etc., of the local environment (e.g., the mobile platform), the global environment (e.g., the external scene or environment), and/or the user.

According to at least one example, a method is provided for immersive extended reality experiences on mobile platforms. The method can include obtaining sensor measurements from one or more sensors on a mobile platform and/or a device associated with a user in the mobile platform. The sensor measurements can include motion parameters associated with the mobile platform and the user in the mobile platform. The method can further include identifying features of the mobile platform and features of an environment outside of the mobile platform; tracking, using the sensor measurements, a first pose of the mobile platform relative to the environment outside of the mobile platform; tracking, using the sensor measurements, a second pose of the user relative to at least one of the features of the mobile platform; and tracking, based on the first pose and the second pose, a third pose of the user relative to at least one of the features of the environment outside of the mobile platform.

In another example, an apparatus for immersive extended reality experiences on mobile platforms is provided. The apparatus can include a memory and a processor coupled to the memory, the processor configured to: obtain sensor measurements from one or more sensors on a mobile platform and/or a device associated with a user in the mobile platform, the sensor measurements including motion parameters associated with the mobile platform and the user in the mobile platform; identify features of the mobile platform and features of an environment outside of the mobile platform; track, using the sensor measurements, a first pose of the mobile platform relative to the environment outside of the mobile platform; track, using the sensor measurements, a second pose of the user relative to at least one of the features of the mobile platform; and track, based on the first pose and the second pose, a third pose of the user relative to at least one of the features of the environment outside of the mobile platform.

In another example, a non-transitory computer-readable medium for immersive extended reality experiences on mobile platforms is provided. The non-transitory computer-readable medium can include instructions which, when executed by one or more processors, cause the one or more processors to obtain sensor measurements from one or more sensors on a mobile platform and/or a device associated with a user in the mobile platform, the sensor measurements including motion parameters associated with the mobile platform and the user in the mobile platform; identify features of the mobile platform and features of an environment outside of the mobile platform; track, using the sensor measurements, a first pose of the mobile platform relative to the environment outside of the mobile platform; track, using the sensor measurements, a second pose of the user relative to at least one of the features of the mobile platform; and track, based on the first pose and the second pose, a third pose of the user relative to at least one of the features of the environment outside of the mobile platform.

In another example, an apparatus including means for providing immersive extended reality experiences on mobile platforms is described. The apparatus can include means for obtaining sensor measurements from one or more sensors on a mobile platform and/or a device associated with a user in the mobile platform. The sensor measurements can include motion parameters associated with the mobile platform and the user in the mobile platform. The apparatus can further include means for identifying features of the mobile platform and features of an environment outside of the mobile platform; tracking, using the sensor measurements, a first pose of the mobile platform relative to the environment outside of the mobile platform; tracking, using the sensor measurements, a second pose of the user relative to at least one of the features of the mobile platform; and tracking, based on the first pose and the second pose, a third pose of the user relative to at least one of the features of the environment outside of the mobile platform.

In some aspects, the method, non-transitory computer readable medium, and apparatuses described above can include detecting, using an environment classifier and image data captured by at least one of the one or more sensors, that the user has entered a different mobile platform; identifying additional features associated with the different mobile platform; and tracking an additional pose of the user relative to the additional features associated with the different mobile platform. In some examples, detecting that the user has entered the different mobile platform can include receiving an image of a current environment associated with the user; partitioning, using an image segmentation algorithm, the image into multiple image segments; and based on the multiple image segments, identifying one or more regions in the image that correspond to a map of the different mobile platform, the different mobile platform being associated with the current environment. Moreover, in some examples, identifying one or more regions in the image that correspond to the map of the different mobile platform can include matching the additional features associated with the different mobile platform with the one or more points in the map of the different mobile platform.

In some aspects, the method, non-transitory computer readable medium, and apparatuses described above can include detecting that the user has exited the mobile platform based on an inconsistency between the sensor measurements and geometric constraints computed for the mobile platform. In some examples, the geometric constraints can be computed by tracking a subset of points in a map of the mobile platform.

In some aspects, the method, non-transitory computer readable medium, and apparatuses described above can include determining whether the sensor measurements fit two or more maps associated with two or more mobile platforms; when the sensor measurements fit the two or more maps associated with the two or more mobile platforms, determining that a global map of the environment outside of the mobile platform includes the two or more maps associated with the two or more mobile platforms; and storing, on the global map, an indication that the global map includes the two or more maps associated with the two or more mobile platforms.

In some aspects, the method, non-transitory computer readable medium, and apparatuses described above can include anchoring virtual content to one or more features in a first map of the mobile platform and/or a second map of the environment outside of the mobile platform; and displaying the virtual content on one or more regions in the mobile platform and/or the environment outside of the mobile platform. The one or more regions can correspond to, for example, the one or more features in the first map of the mobile platform and/or the second map of the environment outside of the mobile platform. In some aspects, the method, non-transitory computer readable medium, and apparatuses described above can further include obtaining additional sensor measurements from the one or more sensors, the additional sensor measurements including a relative velocity associated with the mobile platform, a relative acceleration of the mobile platform, a trajectory of the mobile platform, and/or an altitude of the mobile platform; and adapting a display location of the virtual content and/or a display configuration of the virtual content based on the relative velocity associated with the mobile platform, the relative acceleration of the mobile platform, the trajectory of the mobile platform, and/or the altitude of the mobile platform.

In some aspects, the method, non-transitory computer readable medium, and apparatuses described above can include displaying the virtual content within a virtual representation of the one or more regions in the mobile platform and/or the environment outside of the mobile platform. The virtual content can include, for example, audio, a virtual image, a virtual video, digital content, one or more virtual games, interactive virtual content, a virtual content overlay, a virtual scene, a virtual simulation, a virtual object, and/or a virtual web page.

In some aspects, the method, non-transitory computer readable medium, and apparatuses described above can include tracking drift between a first sensor mounted on a wearable device associated with the user and a second sensor mounted on the mobile platform, based on image data captured by the first sensor mounted on the wearable device and/or the second sensor mounted on the mobile platform, the first sensor being configured to detect features associated with the wearable device and the second sensor being configured to detect features associated with the mobile platform and the environment outside the mobile platform, the features including motion parameters and/or scene properties; and adjusting, based on the drift, one or more sensor biases associated with at least one of the one or more sensors, the one or more sensors including the first sensor mounted on the wearable device and the second sensor mounted on the mobile platform.

In some examples, at least one of the one or more sensors is mounted on a wearable device associated with the user and at least one additional sensor is mounted on the mobile platform. The at least one sensor can be configured to detect one or more features associated with the wearable device and the at least one additional sensor can be configured to detect one or more features associated with the mobile platform and the environment outside the mobile platform. The one or more features can include motion parameters and/or scene properties.

In some examples, tracking the first pose of the mobile platform relative to the environment outside of the mobile platform can include tracking the first pose of the mobile platform relative to a first map of the environment outside of the mobile platform, and tracking the second pose of the user can include tracking the second pose of the user relative to a second map of the mobile platform. Moreover, in some examples, identifying features of the mobile platform and features of the environment outside of the mobile platform can include tracking a first set of features in a first map of the mobile platform and a second set of features in a second map of the environment outside of the mobile platform.

In some implementations, the sensor measurements can include a velocity of the mobile platform relative to the environment outside of the mobile platform, an acceleration of the mobile platform relative to the environment outside of the mobile platform, a trajectory of the mobile platform, an altitude of the mobile platform, a location of the mobile platform, a position of the user, and/or a motion of the user. Further, in some cases, tracking the first pose of the mobile platform and tracking the second pose of the user can be based on the velocity of the mobile platform relative to the environment outside of the mobile platform, the acceleration of the mobile platform relative to the environment outside of the mobile platform, the trajectory of the mobile platform, the altitude of the mobile platform, the location of the mobile platform, the position of the user, and/or the motion of the user.

In some implementations, the one or more sensors can include one or more inertial measurement units, one or more image sensors, one or more radars, one or more odometry devices, one or more light-emitters, and/or one or more lidars. Moreover, in some examples, the mobile platform can include a vehicle, an elevator, an aircraft, a vessel, and/or a conveyance.

In some aspects, the method, non-transitory computer readable medium, and apparatuses described above can include anchoring virtual content to one or more features in a first map of the mobile platform and/or a second map of the environment outside of the mobile platform; translating a motion associated with the mobile platform, the user, and/or the environment outside of the mobile platform into a virtual motion, the motion being translated based on the first pose, the second pose, the third pose and/or the motion parameters; and displaying the virtual content on one or more regions of the mobile platform and/or the environment outside of the mobile platform. In some cases, the one or more regions can correspond to the one or more features in the first map of the mobile platform and/or the second map of the environment outside of the mobile platform. Also, in some cases, at least a portion of the virtual content displayed can reflect the virtual motion.

In some aspects, the apparatuses described above can include the one or more sensors and/or the device associated with the user. In some examples, the device associated with the user can include a mobile phone, a wearable device, a display device, a mobile computer, a head-mounted display, and/or a camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles described above will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
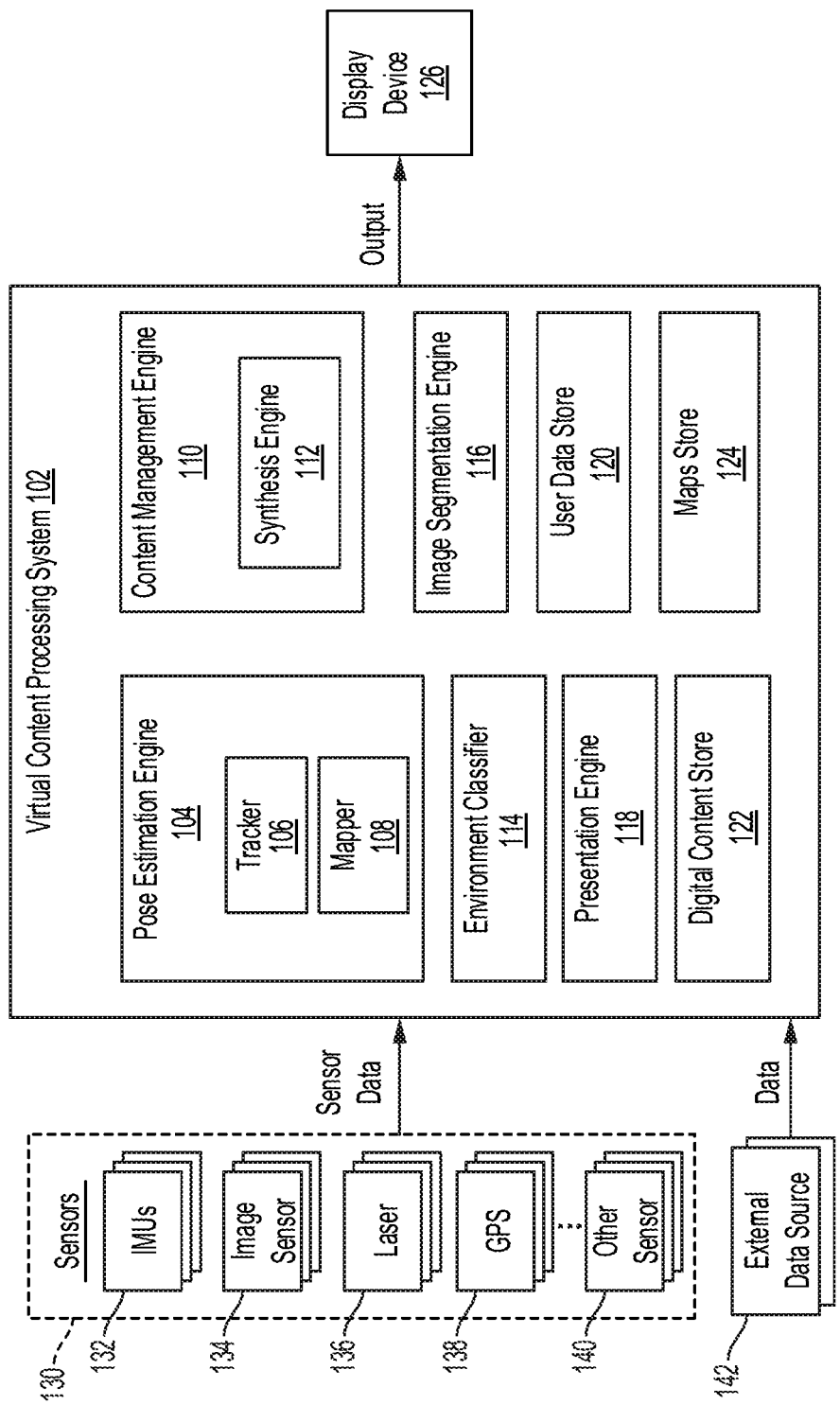
FIG. 1 illustrates an example of a virtual content processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As previously explained, extended reality (XR) technologies can combine real or physical environments and virtual environments (and/or virtual content) to provide users with extended reality experiences (e.g., virtual reality, augmented reality, mixed reality, etc.). To provide realistic XR experiences, XR technologies generally aim to integrate virtual content with the physical world. This typically involves generating a map of the real-world environment and calculating a particular point of view or pose relative to the map of the real-world environment in order to anchor virtual content to the real-world environment in a convincing manner. The point of view or pose information can be used to match virtual content with the user's perceived motion and the spatio-temporal state of the real-world environment.

However, in some cases, point of view or pose information can be very difficult to track, and tracking inaccuracies can have a significant impact on the user's XR experience. For example, a user's movement can be difficult to accurately track and predict, and is a common cause of spatio-temporal inconsistencies between the virtual content and the real-world environment as perceived by the user. These challenges can be further complicated when XR technologies are implemented in moving platforms (e.g., vehicles, elevators, boats, bicycles, skateboards, scooters, motorcycles, airplanes, conveyor belts, etc.) which often involve tracking features within the moving platform as well as visible features outside of the moving platform. The differences and frequent changes in the relative movement and point of view of the user, the moving platform and the environment outside of the moving platform can increase the risk of tracking errors and perceived inaccuracies. Moreover, drift and artifacts are common when tracking features within the moving platform and the outside environment, which can further degrade the user's XR experience.

Figure 12:
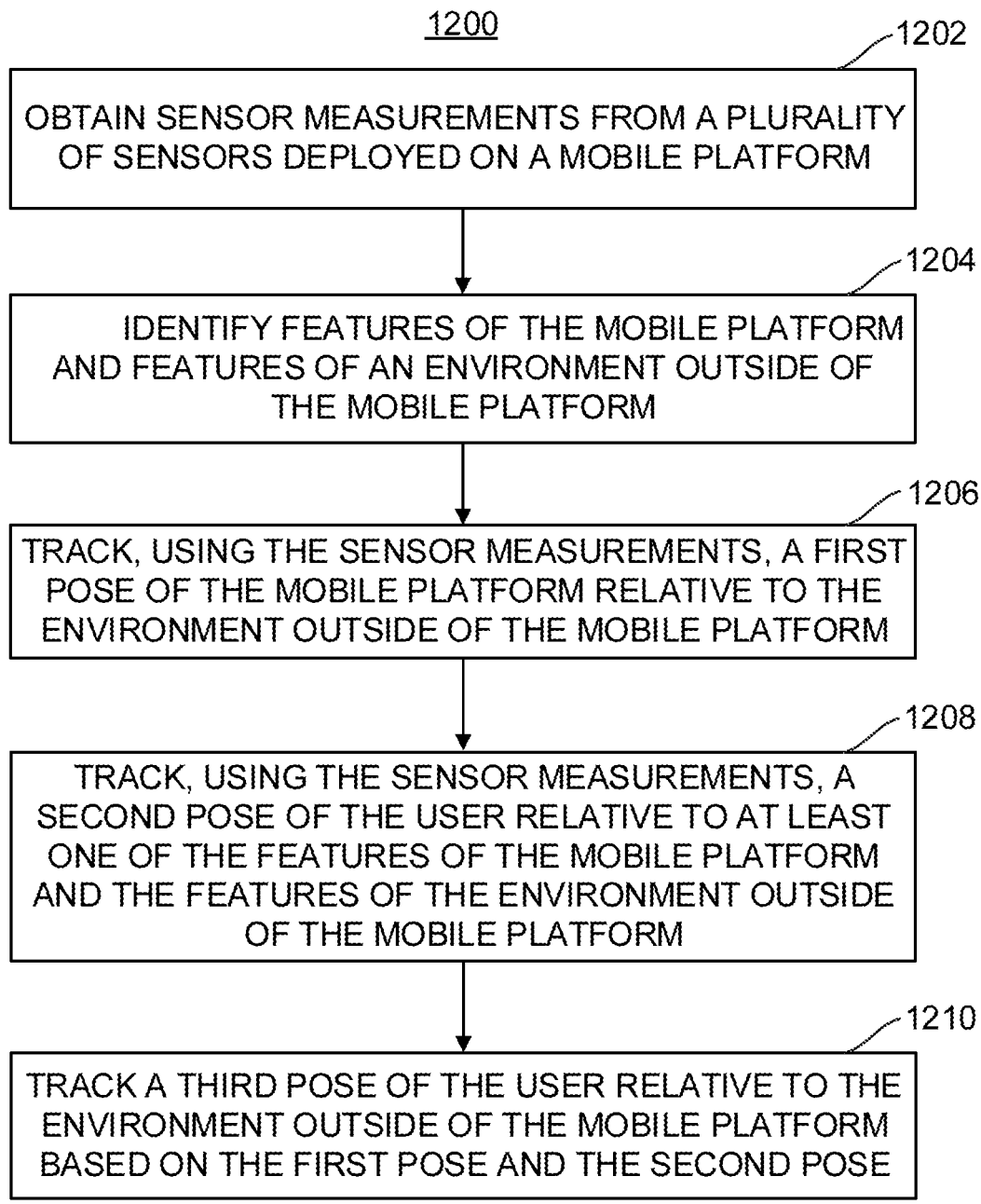
FIG. 12 illustrates an example method for providing immersive extended reality experiences on moving platforms, in accordance with some examples.
Figure 13:
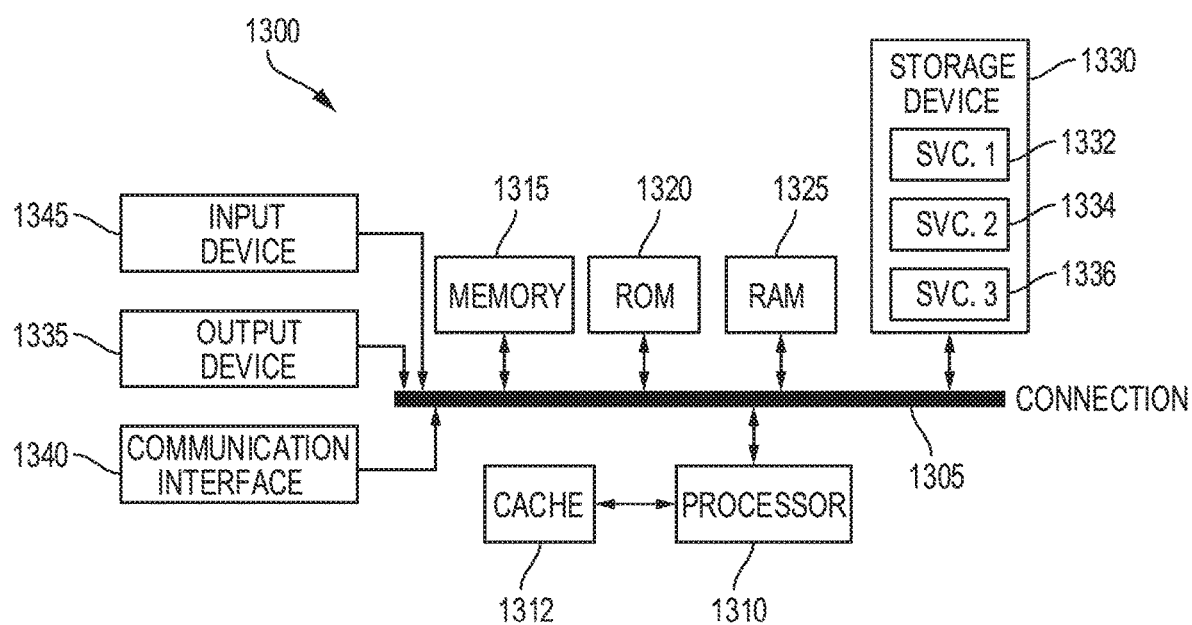
FIG. 13 illustrates an example computing device architecture, in accordance with some examples.

The present disclosure describes systems, methods, and computer-readable media for providing immersive extended reality experiences on mobile platforms. The present technology will be described in the following disclosure as follows. The discussion begins with a description of example systems and technologies for providing extended reality experiences in mobile platforms, as illustrated in FIGS. 1 through 11. A description of example methods for providing extended reality experiences in mobile platforms, as illustrated in FIG. 12, will then follow. The discussion concludes with a description of an example computing device architecture including example hardware components suitable for performing extended reality operations, as illustrated in FIG. 13. The disclosure now turns to FIG. 1

FIG. 1 is a diagram illustrating an example of a virtual content processing system 102. The virtual content processing system 102 can be implemented to provide immersive XR experiences as described herein. The virtual content processing system 102 can include a pose estimation engine 104, a content management engine 110, an environment classifier 114, an image segmentation engine 116, a presentation engine 118, a user data store 120, a digital content store 122, and a maps store 124. The pose estimation engine 104 can also include a tracker 106 and a mapper 108. Moreover, the content management engine 110 can include a synthesis engine 112. In some cases, the virtual content processing system 102 can also include other components, such as, for example and without limitation, a display, a projector, a front-end processing engine, a filtering engine, a sensor fusion engine, a denoising engine, a rules engine, etc.

The components of the virtual content processing system 102 can include and/or can be implemented using electronic circuits or other electronic hardware, which can include, for example, one or more programmable electronic circuits (e.g., microprocessors, graphics processing units (GPUs), digital signal processors (DSPs), central processing units (CPUs), image signal processors (ISPs), and/or any other suitable electronic circuits), and/or can include and/or can be implemented using computer software, firmware, or any combination thereof, to perform the various operations described herein. While the virtual content processing system 102 is shown to include certain components, one of ordinary skill will appreciate that the virtual content processing system 102 can include more or fewer components than those shown in FIG. 1. For example, in some instances, the virtual content processing system 102 can also include one or more memory components (e.g., one or more RAMs, ROMs, caches, buffers, and/or the like) and/or processing devices that are not shown in FIG. 1.

The virtual content processing system 102 can be part of, or implemented by, one or more computing devices, such as one or more servers, one or more personal computers, one or more processors, one or more mobile devices (e.g., a smartphone, a camera, a smart television, a tablet computer, an internet-of-things device, etc.). In some cases, the one or more computing devices that include the virtual content processing system 102 can one or more hardware components such as, for example, one or more wireless transceivers, one or more input devices, one or more output devices (e.g., a display), one or more sensors (e.g., an image sensor), one or more storage devices, one or more processing devices, etc. In some examples, a computing device that includes the virtual content processing system 102 can be an electronic device, such as a phone (e.g., a smartphone, a video conferencing system, or the like), a camera (e.g., a digital camera, an IP camera, a video camera, a camera phone, a video phone, or other any suitable capture device), a desktop computer, a laptop or notebook computer, a tablet computer, a set-top box, a television, a display device, a digital media player, a video gaming console, a video streaming device, or any other suitable electronic device. In some cases, the virtual content processing system 102 can be part of, or implemented by, one or more devices or combination of devices, such as a head-mounted display (HMD) device, a laptop computer, a tablet computer, a television, a smart wearable device, a smart vehicle, a mobile phone, smart goggles, a camera system, a display system, a projector, a server, a heads-up display (HUD), or any other suitable electronic device. For example, the virtual content processing system 102 can be part of an HMD device, a HUD device including a display (e.g., a transparent display) for presenting data, or a client computer. In another example, the virtual content processing system 102 can be implemented by a combination of an HMD device, a display or HUD, and/or a mobile computing device.

The virtual content processing system 102 can receive as input data from one or more of the sensors 130 and/or external data sources 128, and use the input data to perform various tasks for providing an XR experience, including, for example, mapping operations, localization operations, virtual content anchoring operations, virtual content generation operations, etc. The sensors 130 can include, for example, one or more inertial measuring units (IMUS) 132, one or more image sensors 134 (e.g., camera sensors or devices), one or more light emitters 136 (e.g., one or more lasers), one or more global positioning system (GPS) devices 138, and/or one or more other sensors 140 (e.g., radars, accelerometers, gyroscopes, magnetometers, altimeters, tilt sensors, motion detection sensors, light sensors, audio sensors, lidars, etc.). In some cases, one or more of the sensors 130 can be part of, or implemented by, the virtual content processing system 102. For example, in some cases, the virtual content processing system 102 can implement an IMU (132), an image sensor (134), and/or a GPS device (138).

In some implementations, the sensors 130 are distributed across different locations and/or implemented by two or more different electronic devices. For example, in some cases, one or more of the sensors 130 can be mounted on an outside of a moving platform, one or more of the sensors 130 can be mounted on an inside of the moving platform, and one or more of the sensors 130 can be mounted on (or implemented by) the virtual content processing system 102. To illustrate, the virtual content processing system 102 can include an IMU (132), an image sensor (134), and/or a GPS device (138); and a moving platform can have an IMU (132), an image sensor (134), a light emitter (136) such as a laser, a GPS device (138), and/or another sensor (140) mounted on an exterior or outside of the moving platform, as well as an IMU (132), an image sensor (134), a light emitter (136), a GPS device (138), and/or another sensor (140) mounted in the inside of the moving platform. The number and/or type of sensors 130 included on an exterior or outside of the moving platform, an interior of the moving platform, and the virtual content processing system 102 can vary in different implementations.

The one or more IMUs 132 can be used to measure an object's force and angular rate. In some cases, the one or more IMUs 132 can also be used to measure the magnetic field surrounding the object. The one or more image sensors 134 can capture image and/or video data. The one or more image sensors 134 can include, for example, one or more image and/or video capturing devices, such as a digital camera, a video camera, a phone with a camera, a tablet with a camera, an image sensor, or any other suitable image data capturing device. The one or more light emitters 136 can include any light-emitting devices such as an infrared (IR) laser or a lidar. In some cases, the one or more light emitters 136 can include a structured light sensor or device for scanning and/or determining the dimensions and movement of an object or scene. The structured light sensor or device can project a known shape or pattern onto an object or scene, and determine the dimensions and movement of the object or scene based on measured or detected deformations of the shape or pattern.

The one or more GPS devices 138 can be used to obtain geolocation and time information. Moreover, the one or more external sources 128 can provide various types of information such as, for example and without limitation, geographic information system (GIS) data (e.g., spatial data, geographic data, topological information, map data, spatio-temporal data, geostatistics, location attributes and/or statistics, traffic data, routes, elevation data, geographical intelligence data, etc.), digital or virtual content, weather information, travel or transportation data, news data, audio data, landscape information, tracking information, reports, statistics, information updates, research data, environmental information, etc. The one or more external sources 128 can include, for example, the Internet, a server, a storage system, an external or remote computer, a content provider, a satellite, an access point, an IoT (internet of things) device, a datacenter, a public and/or private cloud, a data repository, a network, etc.

The pose estimation engine 104 in the virtual content processing system 102 can receive sensor data from the sensors 130, and use the sensor data to estimate a pose of one or more objects, track the one or more objects, and generate one or more maps of one or more real-world environments. The sensor data can include, for example, one or more images, one or more videos, audio or sound data, location information, radar returns, object and/or scene measurements (e.g., an object's and/or scene's shape or dimensions, motion or movement, trajectory or direction, characteristics, speed or velocity, elevation, position, force, angular rate, pattern(s), etc.), GPS information, etc. In some cases, the pose estimation engine 104 can also receive and use information from the one or more external sources 128, such as traffic data, map data, GIS data, statistics, tracking data, etc.

In some cases, the pose estimation engine 104 can use the received data (e.g., sensor data from the sensors 130, additional data from the one or more external sources 128) to estimate a pose of a user in a mobile platform relative to the mobile platform and/or an outside environment (e.g., the environment, world, or setting outside of the mobile platform), and a pose of the mobile platform relative to the outside environment. The mobile platform can include any type of mobile environment or transportation system, such as a vehicle, a boat or vessel, an aircraft, a conveyor belt, a moving staircase, a train, a roller coaster or theme park ride, an elevator, a skateboard, a bicycle, a scooter, or any other conveyance. In some examples, the pose of the user can be determined or inferred by calculating the pose of a device of the user or associated with the user, such as a device worn by or mounted on the user (e.g., an HMD, a smart wearable device, etc.), a device held by or in close proximity to the user (e.g., a laptop computer, a smartphone, etc.), or any other device within the mobile platform that can be used to estimate the pose of the user.

To estimate the pose of the user relative to the mobile platform and/or the outside environment, and the pose of the mobile platform relative to the outside environment, the pose estimation engine 104 can implement a tracker 106. The tracker 106 can use sensor data from sensors (130) within the mobile platform, on an outside or exterior of the mobile platform, and/or on the device associated with the user (e.g., an HMD worn by the user). For example, the tracker 106 can use sensor data obtained from one or more sensors on an outside or exterior of the mobile platform, which can include measurements (e.g., speed, location, direction, altitude, acceleration, position, angular rate, environment characteristics, motion dynamics, etc.) of the outside environment (e.g., outside being relative to the mobile platform); sensor data obtained from one or more sensors in the mobile platform, which can include measurements (e.g., speed, location, direction, altitude, acceleration, position, angular rate, environment characteristics, motion dynamics, etc.) of the mobile platform and/or the environment inside of the mobile platform; and/or sensor data obtained from one or more sensors mounted on or implemented by a device associated with the user, which can include measurements (e.g., speed, location, direction, altitude, acceleration, position, angular rate, environment characteristics, motion dynamics, etc.) of the user (or the device associated with the user), the mobile platform and/or the environment inside of the mobile platform.

Since sensors often contain errors (which can be random in nature), the observations or measurements from sensors (130) can be processed through one or more filters that estimate a target's states (e.g., pose, velocity, trajectory, acceleration, position, altitude, etc.) and error covariance. Accordingly, in some examples, the tracker 106 can implement one or more filters (e.g., one or more Kalman filters, one or more extended Kalman filters, etc.), one or more motion models (e.g., one or more acceleration models, one or more angular rate models, one or more velocity models, etc.), and/or any other tracking algorithms or models to estimate a target's (e.g., the mobile platform, the outside environment, the user or device associated with the user, etc.) state (e.g., pose, velocity, trajectory, position, acceleration, altitude, etc.). In some example, the tracker 106 can process sensor data using a Kalman filter or an extended Kalman filter (EKF) to estimate the states and error covariances of the mobile platform, the outside environment, and/or the user or the device associated with the user.

The Kalman filtering process, also known as linear quadratic estimation (LQE), uses an algorithm that can apply a series of measurements observed over time, which can contain statistical noise and other inaccuracies, and produce estimates of unknown variables by estimating a joint probability distribution over the variables for each timeframe. The EKF filtering process implements an EKF algorithm, which is the nonlinear version of the Kalman filter, that linearizes about an estimate of the current mean and covariance. The Kalman or EKF filter can include a prediction step and a measurement update step. The prediction step relies on one or more models (e.g., an acceleration model, an angular rate model, a velocity model, etc.) for the target dynamics to propagate or predict the target's states at some point in the future. Once the target's states have been propagated, a measurement can be applied to further increase the accuracy of the estimation.

As described above, the tracker 106 can estimate and track the pose of the mobile platform relative to the outside environment, and the pose of the user, or a device associated with the user, relative to the mobile environment. In some cases, the tracker 106 can also track other features. For example, the tracker 106 can detect and/or track features (e.g., objects, characteristics, etc.) within the mobile platform and/or the outside environment. The estimated pose information and/or tracked features can then be used to provide an XR experience to the user as further described herein.

The pose estimation engine 104 can also include a mapper 108 to perform mapping operations. The mapper 108 can use data from the sensors 130 to generate one or more maps or representations of one or more environments, such as the mobile platform and the outside environment. The one or more maps or representations can chart, plot, model, or identify objects, space, and/or characteristics of the mobile platform and the outside environment. For example, the mapper 108 can generate a mobile map that charts, plots, models, or identifies objects, space, and/or characteristics (e.g., shape, volume, size, position, etc.) of the mobile platform, and a global map that charts, plots, models or identifies objects, space, and/or characteristics of the outside environment. In some implementations, the mobile map and the global map can be two-dimensional (2D) or three-dimensional (3D) grids or models of the mobile platform and the outside environment, respectively.

The mapper 108 can also embed metadata in a global map (e.g., map of environment outside of, or external to, a mobile platform) to indicate the presence of one or more mobile maps within the global map. For example, the mapper 108 can embed metadata in a global map of a building to indicate presence of one or more mobile maps of one or more elevators in the buildings. In some cases, the mapper 108 can also use data from the tracker 106, such as tracking, pose or location information, to generate the one or more maps. For example, the mapper 108 can use data from the tracker 106 to identify the location of mobile maps or correct artifacts in a mobile map caused by movement of an associated mobile platform. Moreover, in some implementations, in addition to, or in lieu of, generating the one or more maps, the mapper 108 can perform operations to map virtual objects or content to features in a map of the mobile platform (e.g., a mobile map) and/or a map of the outside environment (e.g., a global map). In such implementations, the mapper 108 can also use information from the tracker 106 when determining where or how to map virtual objects or content to features in the maps.

In some examples, the mapper 108 or pose estimation engine 104 can store any maps generated in a maps store 124 for use in providing XR experiences to users. The maps store 124 can be a storage or repository of maps available for one or more environments, such as the mobile platform and/or the outside environment. The maps store 124 can include one or more storage devices for storing maps and any other data. In some cases, the maps store 124 can also store maps obtained by the virtual content processing system 102 from other sources (e.g., external data source 128). For example, the maps store 124 can include one or more maps received by the virtual content processing system 102 from the Internet, a separate mapping system, a repository of generated or preconfigured maps, etc.

The virtual content processing system 102 can also include a content management engine 110, as previously explained. The content management engine 110 can manage, generate, synthesize, modify, and/or process content used to provide XR experiences to the user. In some cases, the content management engine 110 can store the content on the digital content store 122 and/or retrieve the content from the digital content store 122. The digital content store 122 can store various content items generated, stored, received, managed, and/or used by the content management engine 110. The digital content store 122 can include one or more storage devices for storing content. Moreover, the content can include, for example and without limitation, digital or virtual content, games, advertisements, tagged geolocations, Internet content, audio content, videos, images, documents, interactive content, content overlays, web pages, files, data (e.g., statistics, historical data, etc.), electronic or digital maps, and/or any other type of media, digital or virtual content.

The content management engine 110 can include a synthesis engine 112 to synthesize content for presentation and/or inclusion in an XR presentation or experience. The synthesis engine 112 can perform various computer vision and/or graphics techniques (e.g., feature extraction, feature matching or synchronization, feature classification, image processing, filtering, blending, depth estimation, 3D modeling, pose recognition, image stitching, object recognition, denoising, animation, rendering, etc.) to generate realistic virtual content and/or simulate environments and experiences that are virtual. The synthesized content generated by the synthesis engine 112 can include, for example, 2D or 3D digital content and/or multimedia content, such as virtual scenes, virtual objects, virtual views, virtual overlays, interactive virtual content, audio, graphical models, computer-generated imagery, virtual simulations, etc. In some cases, the synthesized content can also include one or more visual or special effects, such as animations, simulations, optical effects, mechanical effects, etc.

The content synthesis engine 112 can take content (e.g., audio, image content, video content, data, digital content, multimedia content, etc.) and synthesize the content to generate the virtual content or view for presentation to a user. The content synthesis engine 112 can also use information about one or more frames of reference (e.g., view point data, pose data, positioning data, etc.) to generate realistic and/or immersive content for the XR experience. In some illustrative examples, the content synthesis engine 112 can use the information about the one or more frames of reference to match, map, or synchronize features in content, objects and/or real-world environments (or maps of real-world environments such as mobile maps and global maps), model objects and/or scenes with merged perspectives, produce realistic spatio-temporal content, incorporate motion dynamics of an environment, etc.

The virtual content processing system 102 can also include an environment classifier 114 to identify a user's environment (e.g., a specific mobile platform) and detect whether a user has entered, or is entering, a different mobile map or mobile platform. For example, the environment classifier 114 can detect whether a user has left a first mobile map or platform (e.g., an elevator) and has entered a different mobile map or platform (e.g., a car). This information can be used by the virtual content processing system 102 to change the mobile map used to provide the XR experience to the user; discern features associated with the user's new environment; make adjustments to the content, pose information, features tracked, etc., used to provide the XR experience to the user; etc.

The environment classifier 114 can detect a change in the applicable mobile map or platform based on one or more images received from the sensors 130. The one or more images can capture a scene or view of the mobile map or platform applicable to the user. The environment classifier 114 can process the one or more images to classify the user's current environment. In some cases, the environment classifier 114 can use machine learning to learn the user's environment. For example, the environment classifier 114 can process one or more images from the sensors 130 through a neural network to generate a classification output identifying the user's environment.

The virtual content processing system 102 can also include an image segmentation engine 116. The image segmentation engine 116 can process one or more images of an environment to mark regions in the one or more images which belong to a particular map associated with the environment. For example, the image segmentation engine 116 can receive from the sensors 130 an image of a new mobile platform that the user has entered, and process the image to mark regions in the image which belong to a mobile map associated with the new mobile platform. In some examples, the image segmentation engine 116 can implement a machine learning algorithm to perform image segmentation.

The virtual content processing system 102 can implement a presentation engine 118 to project, present, and/or render the virtual content or view for the user. In some cases, the presentation engine 118 can project the virtual content or view on an object or display, such as a window or a screen, for the user. In other examples, the presentation engine 118 can render and/or display the virtual content or view for presentation on a display device 126. In some implementations, the display device 126 can be part of, or implemented by, the virtual content processing system 102. For example, the display device 126 can be a display or screen on the virtual content processing system 102 or connected to the virtual content processing system 102. In other implementations, the display device 126 can be a device separate from the virtual content processing system 102. For example, the display device 126 can be a separate window with an embedded transparent display or a separate television screen.

The virtual content processing system 102 can also include a user data store 120. The user data store 120 can include one or more storage devices for storing data. Moreover, the user data store 120 can store data associated with one or more users. For example, the user data store 120 can store one or more user profiles, user preferences, historical data about one or more users, user statistics, user settings, user customizations, user logs, etc. The user data in the user data store 120 can be used by the content management engine 110 to generate virtual content for the user. The virtual content can be tailored or customized for the user based on the user data in the user data store 120.

While FIG. 1 illustrates the user data store 120, the digital content store 122, and the maps store 124 as separate or individual stores, one of ordinary skill in the art will recognize that the user data store 120, the digital content store 122, and/or the maps store 124 can be implemented as a single combined store. Moreover, one of ordinary skill in the art will recognize that the user data store 120, the digital content store 122, and the maps store 124 can be implemented by the same storage device(s), separate storage devices, or any other storage configuration or distribution.

Figure 2A:
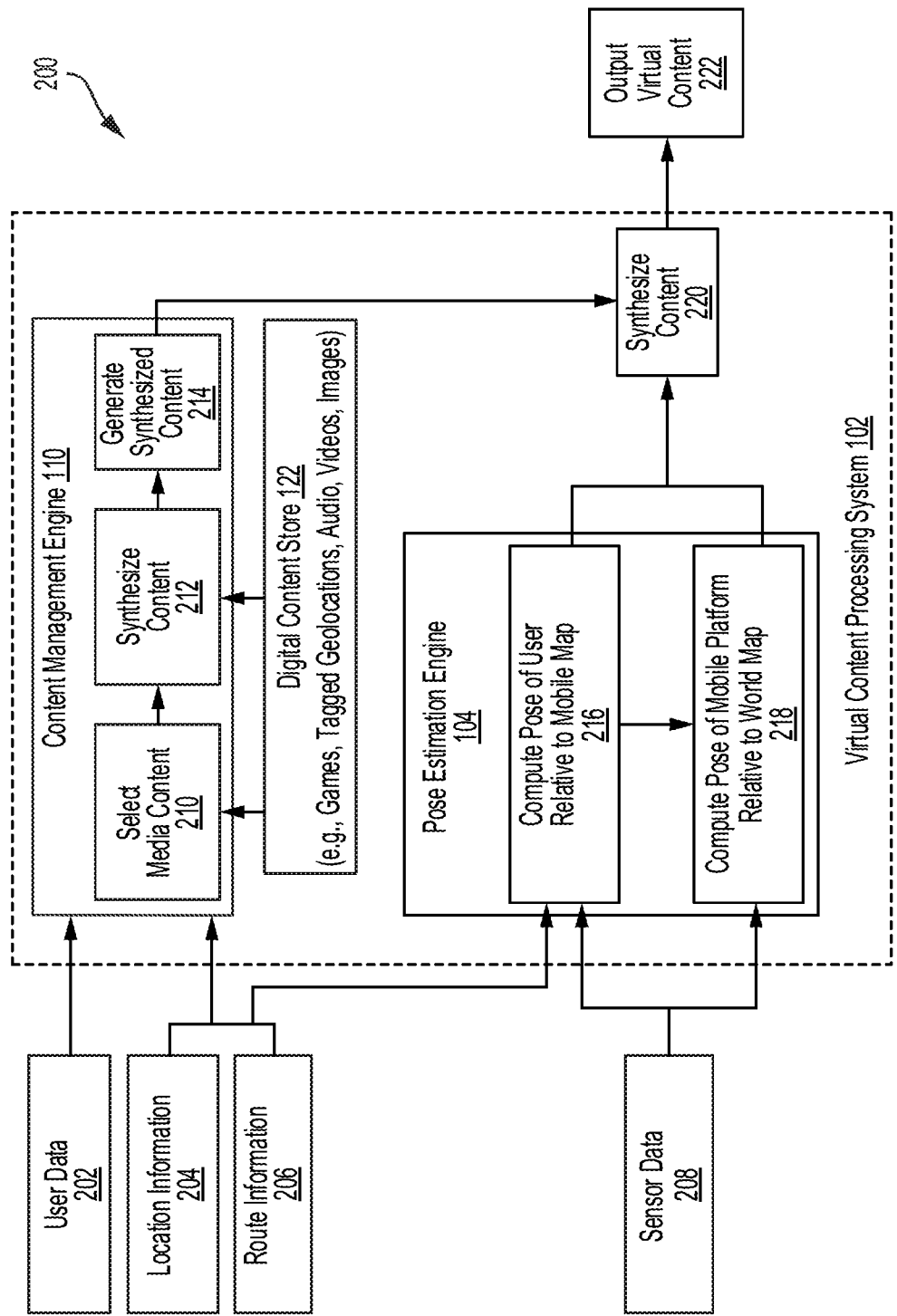
FIG. 2A illustrates a flow diagram of a process for generating an immersive extended reality experience in a mobile platform, in accordance with some examples.

FIG. 2A illustrates a flow diagram of a process 200 for generating an immersive XR experience in a mobile platform. The process 200 for generating an immersive XR experience can combine real or physical environments and virtual environments (and/or virtual content) to provide users with extended reality experiences (e.g., virtual reality, augmented reality, mixed reality, etc.). To provide realistic XR experiences, the process 200 can integrate virtual content with the physical world. This can involve generating a map of the real-world environment and calculating a particular point of view or pose relative to the map of the real-world environment in order to anchor virtual content to the real-world environment in a convincing manner. The point of view or pose information can be used to match virtual content with the user's perceived motion and the spatio-temporal state of the real-world environment.

Point of view or pose information can be very difficult to track, and tracking inaccuracies can have a significant impact on the user's XR experience. For example, a user's movement can be difficult to accurately track and predict, and is a common cause of spatio-temporal inconsistencies between the virtual content and the real-world environment as perceived by the user. These challenges can be further complicated when XR technologies are implemented in moving platforms (e.g., vehicles, elevators, boats, bicycles, skateboards, scooters, motorcycles, airplanes, conveyor belts, etc.) which can involve tracking features within the moving platform as well as visible features outside of the moving platform. The differences and frequent changes in the relative movement and point of view of the user, the moving platform and the environment outside of the moving platform can increase the risk of tracking errors and perceived inaccuracies. Moreover, drift and artifacts are common when tracking features within a moving platform and outside environment, which can further degrade the user's XR experience.

However, in use cases where a user is within a mobile platform (e.g., a vehicle, an elevator, a train, a conveyor belt, a vessel, an aircraft, a boat, a skateboard, a bicycle, a scooter, a conveyance, etc.) that moves relative to an external environment or scene, the process 200 can provide virtual content that matches the perceived motion (e.g., due to inertial forces) of the user in the mobile platform and accounts for the view or pose of the user. The virtual content can be anchored within the mobile platform (and/or a mobile map of the mobile platform) or the external scene (and/or a global map of the external scene) in a manner that accounts for the relative motion of the user, the mobile platform, and external scene. To match the virtual content with the perceived motion of the user, features such as motion and pose can be tracked for the mobile platform, the user, and/or the external scene.

Feature tracking in mobile platforms can result in drift or artifacts due to the use of features within the mobile platform and features that are visible outside of the mobile platform. For example, when anchoring on object relative to a road sign visible through a window of a moving car, the motion of the user within the car (e.g., which can result from head movements, posture changes, etc.) and the relative movement of other features based on the trajectory of the car (e.g., the global motion of the car) can create inconsistent results (and errors) in the XR experience. This can be especially frustrating in scenes where the mobile platform is moving at a high rate of speed, which can result in increasingly inconsistent or misaligned XR experiences.

Accordingly, to accurately match the virtual content with the perceived motion of the user and limit or eliminate any errors and inconsistencies in the XR experience, the process 200 can track the pose of a user within the mobile platform, which can be represented by a mobile map or local motion map, and the pose of the mobile platform relative to the external scene, which can be represented by a global or world map. The user's pose relative to the global map can be transposed while disregarding internal mobile platform features to improve external and internal XR experiences. A synthesis or rendering engine used to display and/or render the virtual content can execute on an independent clock query for the user's pose for greater accuracy.

Moreover, to track features (e.g., pose, motion dynamics, environment features, objects, view characteristics, etc.) within the mobile platform and features outside the mobile platform (e.g., features associated with the external scene), the process 200 can implement various sensors and devices, such as inertial measurement units (IMUs), light-emitting sensors, image sensors or camera sensors, LIDARs, radars, global positioning system (GPS) devices, etc., to collect feature measurements. Sensors can be implemented on the mobile platform, a wearable module such as an HMD (head-mounted display), and/or non-wearable modules in the mobile platform. Local motion (e.g., user pose) can be tracked using IMUs, which can compute high rate pose information (e.g., at a frequency of 1 khz). For example, local motion can be tracked via an HMD (head-mounted display) having one or more sensors (e.g., an IMU, a camera, etc.) or non-wearable modules (e.g., passive/active depth sensing systems mounted inside the mobile platform such as the cabin of a car).

The process 200 can implement one or more sensors (e.g., IMUs, image sensors, radars, light emitters (e.g., lasers), etc.) to measure motion with respect to an external scene (e.g., the global map). The one or more sensors can measure acceleration with respect to an inertial frame of reference (e.g., the global map). Since relying on the measured acceleration with respect to the inertial frame of reference without also accounting for acceleration of the mobile platform (e.g., an accelerating frame of reference, in this case corresponding to the mobile map) can lead to errors and inconsistencies, the process 200 can implement one or more additional sensors (e.g., IMUs, image sensor(s), etc.) on the mobile platform to measure the acceleration of the mobile platform (e.g., the accelerating frame of reference or mobile map) with respect to the global map (e.g., the inertial frame of reference). The data from the one or more sensors measuring acceleration with respect to an inertial frame of reference (e.g., the global map) and the one or more additional sensors measuring the acceleration of the mobile platform (e.g., the accelerating frame of reference or mobile map) with respect to the global map (e.g., the inertial frame of reference) can be combined to estimate the user's pose. Since some sensors can drift over time, an image sensor can be implemented to capture image data used to provide feedback. The image sensor feedback can be used to adjust sensor biases in the system and correct the drift.

As illustrated in process 200 shown in FIG. 2A, the content management engine 110 of the virtual content processing system 102 can first receive user data 202, location information 204, and route information 206, which the content management engine 110 can use to generate virtual content for the XR experience. The virtual content can include, for example and without limitation, interactive content, games, advertisements, audio, virtual overlays, virtual scenes or views, virtual objects, etc.

The user data 202 can include user preferences, a user history, user statistics, a user profile, etc. The location information 204 can include GPS data (e.g., a location and time), GIS data, traffic information associated with one or more geographic locations, a location of a mobile platform and/or a user in the mobile platform, an elevation of a mobile platform and/or a user in the mobile platform, weather information associated with one or more geographic locations, and/or any other location information. The route information 206 can include, for example, a planned route associated with a mobile platform and/or a user in the mobile platform.

The content management engine 110 can receive the user data 202 from the user data store 120 and/or any other source such as the external data source 128. The content management engine 110 can receive the location information 204 from the user data store 120, one or more of the sensors 130, and/or the external data source 128. Moreover, the content management engine 110 can receive the route information 206 from the user data store 120 and/or the external data source 128.

At block 210, the content management engine 110 can select media content to be used for generating the virtual content for the XR experience. In some cases, the media content can be selected based on a user input or preference. For example, the content management engine 110 can select the media content in response to a manual selection of that media content by a user. In other cases, the media content can be selected automatically or intelligently by the content management engine 110 based on one or more factors, such as a context (e.g., location, environment, direction, route, user preference, etc.). For example, the content management engine 110 can determine a context associated with a user based on the user data 202, the location information 204, and/or the route information 206, and select the media content based on the context determined.

The content management engine 110 can select and/or retrieve the media content from the digital content store 122. However, in some implementations, the content management engine 110 can receive some or all of the selected media content from the external data source 128. For example, the content management engine 110 can receive some or all of the media content from the Internet or a content server. The media content can include, for example and without limitation, advertising content, audio content, digital content (e.g., games, video content, image content, tagged geolocations, media content, Internet content, etc.), a web page, a document, and/or any other type of content.

At block 212, the content management engine 110 can perform content synthesis using the selected media content, and at block 214 the content management engine 110 can generate synthesized content based on the content synthesis performed at block 212. In some cases, the content management engine 110 can also retrieve additional content from the digital content store 122 for use along with the selected media content for the content synthesis at block 212. In other cases, the content management engine 110 can also receive additional content from the external data source 128. The content management engine 110 can implement the synthesis engine 112 to perform the content synthesis. The synthesis engine 112 can synthesize the selected media content and any other content retrieved from the digital content store 122 and/or received from the external data source 128, to generate synthesized content for the XR experience. The synthesized content can include, for example and without limitation, interactive content, a game, a video, an image, an advertisement, a virtual overlay, a virtual view, a virtual object, a virtual scene, a simulated environment or experience, multimedia content, and/or any other virtual content.

In addition, the pose estimation engine 104 can receive sensor data 208 from one or more of the sensors 130, which the pose estimation engine 104 can use to compute a pose of a user relative to a mobile map associated with a mobile platform (e.g., a map of a mobile platform such as a car or elevator), and a pose of the mobile platform relative to a global map (e.g., a map of an environment or scene outside of, or external to, the mobile platform). In some cases, the pose estimation engine 104 can also compute a pose of the user relative to the global map or outside environment. For example, the pose estimation engine 104 can use the pose of the user relative to the mobile map and the pose of the mobile platform relative to the global map to compute the pose of the user relative to the global map.

The mobile map and the global map can be generated by the mapper 108 of the pose estimation engine 104 and/or retrieved from the maps store 124. Moreover, the sensor data 208 can include, for example, IMU data, image data, structured light data, radar returns, GPS data, etc. In some examples, the sensor data 208 can include IMU data from one or more IMU sensors 132 on the mobile platform (e.g., mounted or implemented on the inside and/or outside of the mobile platform), IMU data from one or more IMU sensors 132 on a device associated with the user (e.g., an HMD, a laptop computer, a tablet computer, a smart wearable device, a mobile phone, etc.), image data from one or more image sensors 134 on the mobile platform (e.g., mounted or implemented on the inside and/or outside of the mobile platform), image data from one or more image sensors 134 on the device associated with the user, and/or structured light data from one or more light emitters 136 on the mobile platform.

To illustrate, assume the mobile platform is a car driving on a street and a passenger of the car is wearing an HMD with an IMU sensor 132 and an image sensor 134. In addition, assume the car has a light emitter 136 (e.g., a laser), IMU sensors 132 mounted on the inside and outside of the car, and image sensors 134 mounted on the inside and outside of the car. In this example, the sensor data 208 can include IMU data from the IMU sensors 132 on the car (e.g., inside and outside), IMU data from the IMU sensor 132 on the HMD, image data from the image sensors 134 on the car (e.g., inside and outside), image data from the image sensor 134 on the HMD, and structured light data from the light emitter 136 on the car. Thus, the sensor data 208 in this example can include measurements (e.g., from the IMU sensors and the light emitter) and images (e.g., from the image sensors) corresponding to an environment inside of the car and an environment outside of the car (e.g., the street and/or its surroundings). The virtual content processing system 102 can use these images and measurements to compute the pose of the user and the pose of the car, and provide a realistic and immersive XR experience for the user in the car, despite the different relative motion dynamics of the user, the car, and the outside world (e.g., the environment outside of the car).

At block 216, the pose estimation engine 104 can receive the sensor data 208 and compute the pose of the user relative to the mobile map. The mobile map can be a map or representation of the mobile platform where the user is located. For example, the mobile map can be a map or representation of a car or elevator that the user is riding. The pose estimation engine 104 can compute the pose of the user based on the pose of the user's head, for example. The pose of the user's head can be computed based on measurements obtained for a device worn by the user, such as an HMD, or measurements taken for the user's head (e.g., using captured images and/or sensor measurements) and/or one or more regions of the user's body.

Moreover, the pose estimation engine 104 can compute the pose of the user based on relative measurements (e.g., from the sensor data 208) taken for the user (or an associated device) and the mobile map (or the mobile platform associated with the mobile map). For example the pose estimation engine 104 can compute the pose of the user based on a measured location, angular rate, velocity, acceleration, position, and/or any other motion dynamics of the user (or an associated device) and the mobile platform associated with the mobile map.

At block 218, the pose estimation engine 104 can also use the sensor data 208 to compute the pose of the mobile platform relative to the global map. In some cases, the pose estimation engine 104 can also use the pose of the user computed at block 216 to compute the pose of the mobile platform relative to the global map. The global map can be a map or representation of an environment, scene, region, etc., outside of, or external to, the mobile platform associated with the mobile map. For example, if the mobile platform is a car, the global map can be a map or representation of a scene or environment that is outside of the car and/or which can be visible from the car. In another example, if the mobile platform is an elevator, the global map can be a map or representation of the environment or scene outside of the elevator, which may be visible from the elevator. The pose estimation engine 104 can compute the pose of the mobile platform based on the pose of the user and tracking measurements (e.g., from the sensor data 208) of the mobile platform and the outside world or environment. The tracking measurements can include, for example, respective locations, angular rates, velocities, acceleration, positions, and/or any other motion dynamics of the user, the mobile platform, and/or the outside world or environment.

In some implementations, the pose estimation engine 104 can also compute a pose of the user relative to the global map or external environment. For example, the pose estimation engine 104 can use the pose of the user relative to the mobile platform and the pose of the mobile platform relative to the global map to compute the pose of the user relative to the global map. In such implementations, the virtual content processing system 102 can use the pose of the user relative to the global map to generate the virtual content as described below with reference to blocks 220 and 222.

The pose estimation engine 104 can implement the tracker 106 to compute the pose of the user and the mobile platform at blocks 216 and 218. In some examples, the pose estimation engine 104 can implement one or more tracking algorithms and/or models to compute the user's pose. Non-limiting example models and tracking algorithms, including a gyroscope model, an acceleration model and an EKF filter, are described below.

Equations (1) and (2) below illustrate an example accelerometer model which can be used by the pose estimation engine 104. In the equations (1) and (2) below, $y_{acc}^V$ and $y_{acc}^H$ are acceleration samples (e.g., IMU measurements) in the sensor data 208. The $\alpha_S^V$ and $\alpha_S^H$ are the acceleration of the mobile platform and the user (or a device associated with the user such as an HMD) with respect to a global frame of reference (e.g., the outside world or environment). $\beta_V$ and $\beta_H$ are the individual biases of respective accelerometers in at least some of the sensors used to collect the sensor data 208 (e.g., accelerometers in IMU sensors 132 implemented to obtain the sensor data 208). The goal is to estimate the relative acceleration $(\alpha_V^V - \alpha_V^H)$ in the global frame of reference (e.g., the outside world or environment).

$$y_{acc}^V = R_{VS}(\alpha_{S-\gamma s}^V) - \gamma s) + \beta_V + n_V^{accel} \quad \text{Equation (1)}$$

$$y_{acc}^H = R_{HS}(\alpha_{S-\gamma s}^H) + \beta_H + n_H^{accel} \quad \text{Equation (2)}$$

where $n_V^{accel} \sim N(0, Q_H^{accel})$ and $n_H^{accel} \sim N(0, Q_V^{accel})$
Assuming $R_{VS} = R_{VH} R_{HS}$:

$$y_{acc}^V = R_{VS}(\alpha_{S-\gamma s}^V) + \beta_V + n_V^{accel}$$

$$y_{acc}^H = R_{VH}^T R_{VS}(\alpha_{S-\gamma s}^H) + \beta_H + n_H^{acc}$$

$$y_{acc}^V(\alpha_{V-\gamma s}^V) + \beta_V + n_V^{accel}$$

$$y_{acc}^H = R_{VH}^T(\alpha_{V-\gamma V}^H) + \beta_H + n_H^{accel},$$

Rearranging further as illustrated in equations (3) and (4) below:

$$y_{acc}^V - \beta_V - n_V^{accel} = \alpha_{V-\gamma V}^V \quad \text{Equation (3)}$$

$$R_{VH}(y_{acc}^H - \beta_H - n_H^{accel}) = \alpha_{V-\gamma V}^H \quad \text{Equation (4)}$$

Then subtracting equation (3) and equation (4) as illustrated in equation (5) below:

$$(y_{acc}^V - R_{VH} y_{acc}^H) - (\beta_V - R_{VH}\beta_H) - (n_V^{accel} - R_{VH} n_H^{accel})$$
$$= (\alpha_V^V - \alpha_V^H) y^*_{acc} - \beta^*_{VH} - n_{VH}^{accel} = \alpha^*_{VH} \quad \text{Equation (5)}$$

where $n_{VH}^{accel} \sim N(0, Q_V^{accel} + R_{VH}^T Q_H^{accel} R_{VH})$.

The model represented by equation (5) can be used to estimate the relative acceleration of the user (or device associated with the user such as an HMD) with respect to the global frame of reference (e.g., the world or outside environment).

Equations (6) and (7) below illustrate an example gyroscope model which can be used by the pose estimation engine 104. In the equations (6) and (7) below, $y_{gyro}^V$ and $y_{gyro}^H$ are angular velocity samples (e.g., IMU measurements) in the sensor data 208. The wand ware the angular velocities of the mobile platform and the user (or a device associated with the user such as an HMD) with respect to a global frame of reference (e.g., the outside world or environment). $\beta_V$ and $\beta_H$ are the individual biases of respective accelerometers in at least some of the sensors used to collect the sensor data 208 (e.g., accelerometers in IMU sensors 132 implemented to obtain the sensor data 208). The goal is to estimate the relative velocity $(\omega_V^V - \omega_V^H)$ in the global frame of reference.

$$y_{gyro}^V = R_{VS}\omega_S^V + \beta_V + n_V^{gyro} \quad \text{Equation (6)}$$

$$y_{gyro}^H = R_{HS}\omega_S^H + \beta_H + n_H^{gyro} \quad \text{Equation (7)}$$

where $n_V^{gyro} \sim N(0, Q_V^{gyro})$ and $n_H^{gyro} \sim N(0, Q_H^{gyro})$.
Assuming $R_{VS} = R_{VH} R_{HS}$:

$$y_{gyro}^V = R_{VS}\omega_S^V + \beta_V + n_V^{gyro}$$

$$y_{gyro}^H = R_{VH}^T R_{VS}\omega_S^H + \beta_H + n_H^{gyro}$$

$$y_{gyro}^V = \omega_V^V + \beta_V + n_V^{gyro}$$

$$y_{gyro}^H = R_{VH}^T \omega_V^H + \beta_H + n_H^{gyro},$$

Rearranging further as illustrated in equations (8) and (9) below:

$$y_{gyro}^V - \beta_V - n_V^{gyro} = \omega_V^V \quad \text{Equation (8)}$$

$$R_{VH}(y_{gyro}^H - \beta_H - n_H^{gyro}) = \omega_V^H \quad \text{Equation (9)}$$

Then subtracting equation (8) and equation (9) as illustrated in equation (10) below:

$$(y_{gyro}^V - R_{VH} y_{gyro}^H) - (\beta_V - R_{VH}\beta_H) - (n_V^{gyro} - R_{VH} n_H^{gyro})$$
$$= \omega_V^V - \omega_V^H y^*_{gyro} - \beta^*_{VH} - n_{VH}^{gyro} = \omega^*_{VH} \quad \text{Equation (10)}$$

where $n_{VH} \sim N(0, Q_V^{gyro} + R_{VH}^T Q_H^{gyro} R_{VH})$.

The model represented by equation (10) can be used to estimate the relative angular velocity of the user (or device associated with the user such as an HMD) with respect to the global frame of reference (e.g., the world or outside environment).

An example EKF model can be as follows. The state variables can be:

$R_{VH}, T_{VH}, V_{VH}, \beta_V^{accel}, \beta_H^{accel}, \beta_V^{gyro}, \beta_H^{gyro}$.

The prediction step can be as follows:

$$\dot{T}_{VH} = V_{VH} \dot{V}_{VH} = \alpha_{VH}\alpha_{VH} = (y_{acc}^V(t) - R_{VH}(t) y_{acc}^H(t)) -$$
$$(\beta_V^{accel} - R_{VH}\beta_H^{accel}) - (n_V^{accel} - R_{VH} n_H^{accel})$$
$$\dot{R}_{VH} = R_{VH}(t)[((y_{gyro}^V - R_{VH} y_{gyro}^H) - (\beta_V - R_{VH}\beta_H) -$$
$$(n_V^{gyro} - R_{VH} n_H^{gyro}))x] \quad \text{Prediction Step (1)}$$

The update step can then be as follows:

$$y_{cam}^f(t) = \pi^\circ R_{HC}^T R_{VH}^T (T_{Vf} - T_{VH} - R_{VH} T_{HC}) + n_c \quad \text{Update Step (2)}$$

As illustrated above, the EKF algorithm can first perform a prediction step to calculate the tracking state, and subsequently perform an update step to update the prediction results.

Once the pose estimation engine 104 has calculated the pose of the user and the mobile platform, it can provide the pose information to the content management engine 110, which at block 220 uses the pose information to synthesize (e.g., using synthesis engine 112) the content generated at block 214 and produce the virtual content for the XR experience. The content management engine 110 can synthesize audio and any type of digital content to generate a virtual view, scene, object, environment, simulation, etc., using the pose information to ensure the synthesized content produced matches the user's perceived and/or actual motion in the moving platform.

At block 222, the virtual content processing system 102 can output the virtual content resulting from the content synthesis at block 220. In some cases, the virtual content processing system 102 can use the presentation engine 118 to output, render, project, and/or display the virtual content. In some cases, the virtual content processing system 102 can display the output on the display device 126. Moreover, the virtual content can include, for example, a virtual view, a virtual scene, a virtual environment, a virtual simulation, one or more virtual objects, interactive content, one or more games, one or more overlays (e.g., an advertisement overlay), Internet or web page content, audio, video, etc.

In some examples, the virtual content can be anchored to a point(s) or region(s) in the mobile map and/or the global map and presented to the user in a way that appears to blend with the real or physical world around the user. For example, as the user travels in a car (the mobile platform in this example), the virtual content can be presented on a building that is visible from the car and configured to appear as though the virtual content is part of the building. The virtual content displayed to the user can adapt to the motion of the car (e.g., the speed, direction, altitude, position, etc.). Thus, the virtual content can match the perceived motion of the user even when the mobile platform is moving.

Figure 2B:
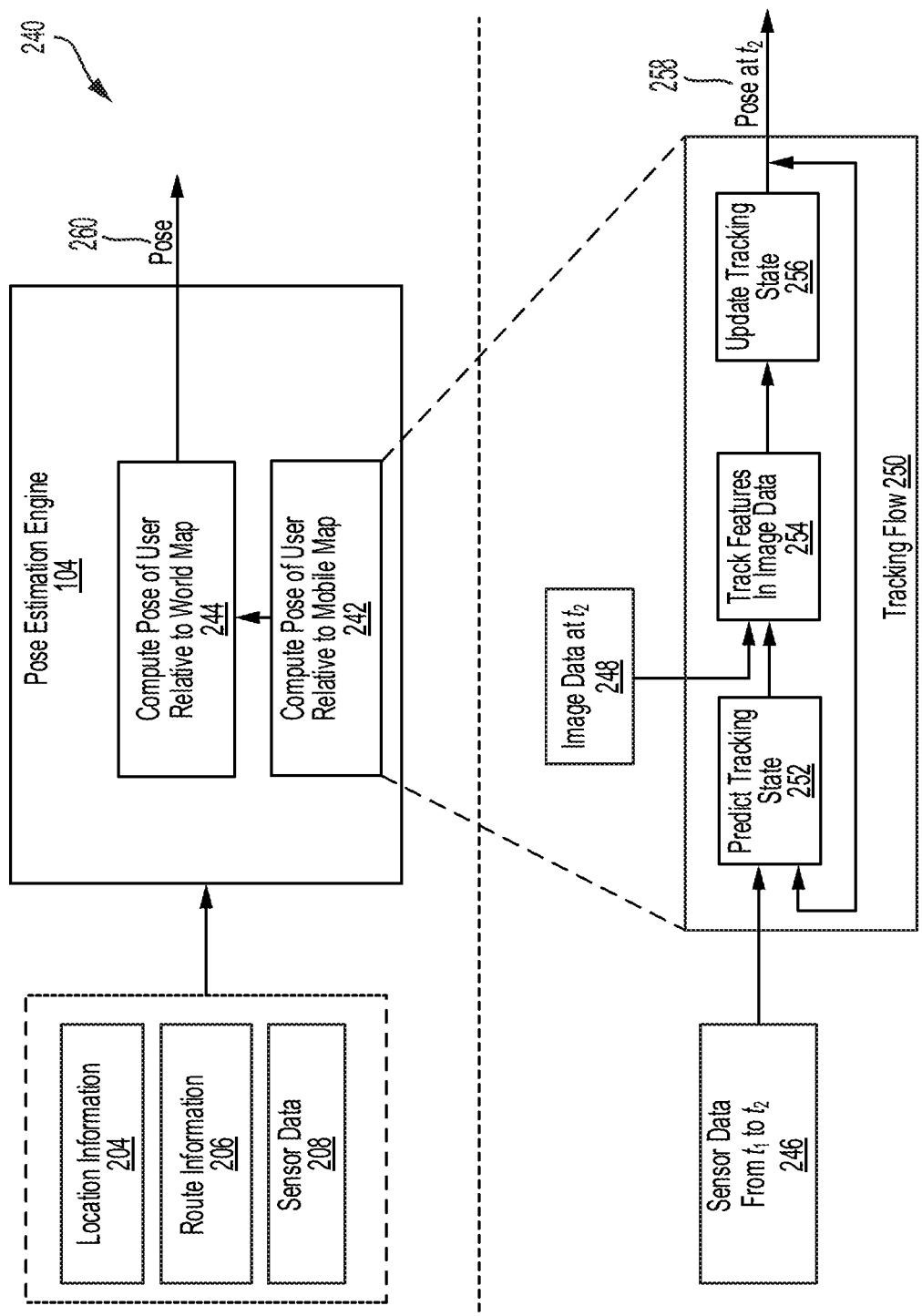
FIG. 2B illustrates an example flow of a process for computing pose information for a user in a mobile platform and using image data to correct sensor bias or drift, in accordance with some examples.

FIG. 2B illustrates an example flow of a process 240 for computing pose information for a user in a mobile platform and using image data to correct sensor bias or drift. In this example, the pose estimation engine 104 computes the pose of the user with respect to the mobile map associated with the mobile platform and the pose of the user with respect to the global map (e.g., the map of the environment outside of the mobile platform). In some examples of process 240, the pose estimation engine 104 can also compute the pose of the mobile platform with respect to the global map.

At block 242, the pose estimation engine 104 first computes the pose of the user relative to the mobile map. The pose estimation engine 104 can compute the pose of the user relative to the mobile map based on tracking flow 250. For example, as illustrated in tracking flow 250, the pose estimation engine 104 first receives sensor data 246 including sensor measurements from time $t_1$ to time $t_2$. The sensor data 246 can include IMU measurements, image data, structured light data, GPS data, etc., obtained from sensors (130) mounted on the mobile platform (e.g., inside and/or outside of the mobile platform) and/or included in one or more devices in the mobile platform, such as an HMD worn by the user. The sensor data 246 can measure various aspects of the location, position and/or motion dynamics of the mobile platform and/or the user in the mobile platform.

At block 252, the pose estimation engine 104 uses the sensor data 246 to predict tracking state (e.g., an estimated track). In some examples, the pose estimation engine 104 can predict the tracking state using the acceleration and gyroscope models previously described (e.g., Equations 1 through 10), and the prediction step (1) in the EKF model previously described. As one of ordinary skill in the art will recognize, in other examples, the pose estimation engine 104 can predict the tracking state using any other suitable tracking models and/or algorithms (in addition to, or in lieu of, the EKF filter, the acceleration model, and/or the gyroscope model previously described). For example, the pose estimation engine 104 can predict a track or state using one or more Kalman filters and one or more different motion models, such as a velocity model.

Moreover, in some examples, the sensor data 246 can include data combined or fused from multiple sensors (130), which can be located within the mobile platform, outside of the mobile platform, and/or on a device associated with the user, such as an HMD. In one illustrative example, the sensor data 246 can include data from one or more IMUs 132 in the mobile platform (e.g., inside and/or outside of the mobile platform) and data from one or more IMUs 132 on an HMD (or any other computing device) on the user. In this example, a portion of the sensor data 246 can measure the acceleration of the user relative to an inertial or global frame of reference (e.g., the outside environment) and another portion of the sensor data 246 can measure the acceleration of the mobile platform relative to the inertial or global frame of reference. The combined measurements can be used to compute an accurate pose for the user while moving in a mobile platform.

It should be noted that the HMD in the previous example is provided as an illustrative example for explanation purposes, and the illustrated principles can be implemented with any other computing device(s), such as a mobile phone or a tablet computer. Further, in some implementations, the sensor data 246 can include structured light data from one or more light emitters 136 on the mobile platform and/or image data from one or more image sensors 134 on the mobile platform. The structured light data and/or the image data in this example can be used in addition to, or in lieu of, any of the sensor data from the IMUs 132 in the previous example (e.g., the IMUs 132 on the mobile platform and the HMD).

At block 254, the pose estimation engine 104 receives image data 248 from time $t_2$ and tracks features in the image data 248. The pose estimation engine 104 can process and/or segment the image data 248 to track features in the image data 248 in order to identify and correct any sensor biases or drift that may skew the tracking results. In one illustrative example, the image data 248 can include one or more images of the user (e.g., the user's head) taken from one or more image sensors (134) on one or more devices associated with the user, such as a camera on an HMD worn by the user. The one or more images can act as feedback at time $t_2$ for correcting any drift associated with one or more sensors. Inertial sensors (e.g., IMUs 132) can experience drift and noise over time. Accordingly, the image data 248 can capture the pose of the user (e.g., the user's head pose), and the image data 248 capturing the pose of the user can then be compared with the measurements from inertial sensors (e.g., some or all of the sensor data 246) to identify and correct any drift or sensor biases.

At block 256, the pose estimation engine 104 can then update the tracking state calculated at block 252. In some examples, the pose estimation engine 104 can update the tracking state using the update step (2) of the EKF algorithm previously described. Moreover, the pose estimation engine 104 can update the tracking state using the sensor data 246 and the image data 248, taking into account any corrections to the sensor data resulting from drift or sensor biases identified at block 254. Based on the updated tracking state, the pose estimation engine 104 can determine the pose 258 of the user at $t_2$. The pose 258 of the user in this example is relative to the mobile map associated with the mobile platform where the user is located.

Having computed the pose 258 of the user, at block 244 the pose estimation engine 104 can use the pose 258 of the user relative to the mobile map and the sensor data 208 to compute a pose 260 of the user relative to the global map (e.g., a map of the environment outside of the mobile platform). In some examples, the pose estimation engine 104 can also use a pose of the mobile map computed relative to the global map to compute the pose 260 of the user relative to the global map.

The sensor data 208 can include measurements from IMU sensors 132 on the mobile platform (outside and/or inside of the mobile platform). In some cases, the sensor data 208 can include measurements from IMU sensors 132 on a device associated with the user, such as an HMD worn by the user or a mobile computing device of the user. In some implementations, the sensor data 208 can also include structured light data from light emitters 136 on the mobile platform, image data from image sensors 134 on the mobile platform and/or a device associated with the user (e.g., an HMD worn by the user), radar returns, and/or any other type of sensor measurements. Also, in some cases, the pose estimation engine 104 can also use the location information 204 (e.g., GPS data, GIS data, etc.) and/or the route information 206 (e.g., a planned route) to compute the pose 260 of the user relative to the global map.

The sensor data 208 as well as any other input information, such as the location information 204 and/or the route information 206, can be used to track features outside of the mobile platform (e.g., the global map) and compute the user's pose relative to the global map. The pose estimation engine 104 can compute the pose 260 of the user at block 244 using the acceleration and gyroscope models previously described (e.g., Equations 1 through 10), and the EKF model (e.g., prediction step 1 and update step 2) previously described. As one of ordinary skill in the art will recognize, in other examples, the pose estimation engine 104 can compute the pose 260 at block 244 using any other suitable tracking models and/or algorithms (in addition to, or in lieu of, the EKF filter, the acceleration model, and/or the gyroscope model previously described). For example, the pose estimation engine 104 can compute the pose 260 using one or more Kalman filters and one or more different motion models, such as a velocity model.

Figure 2C:
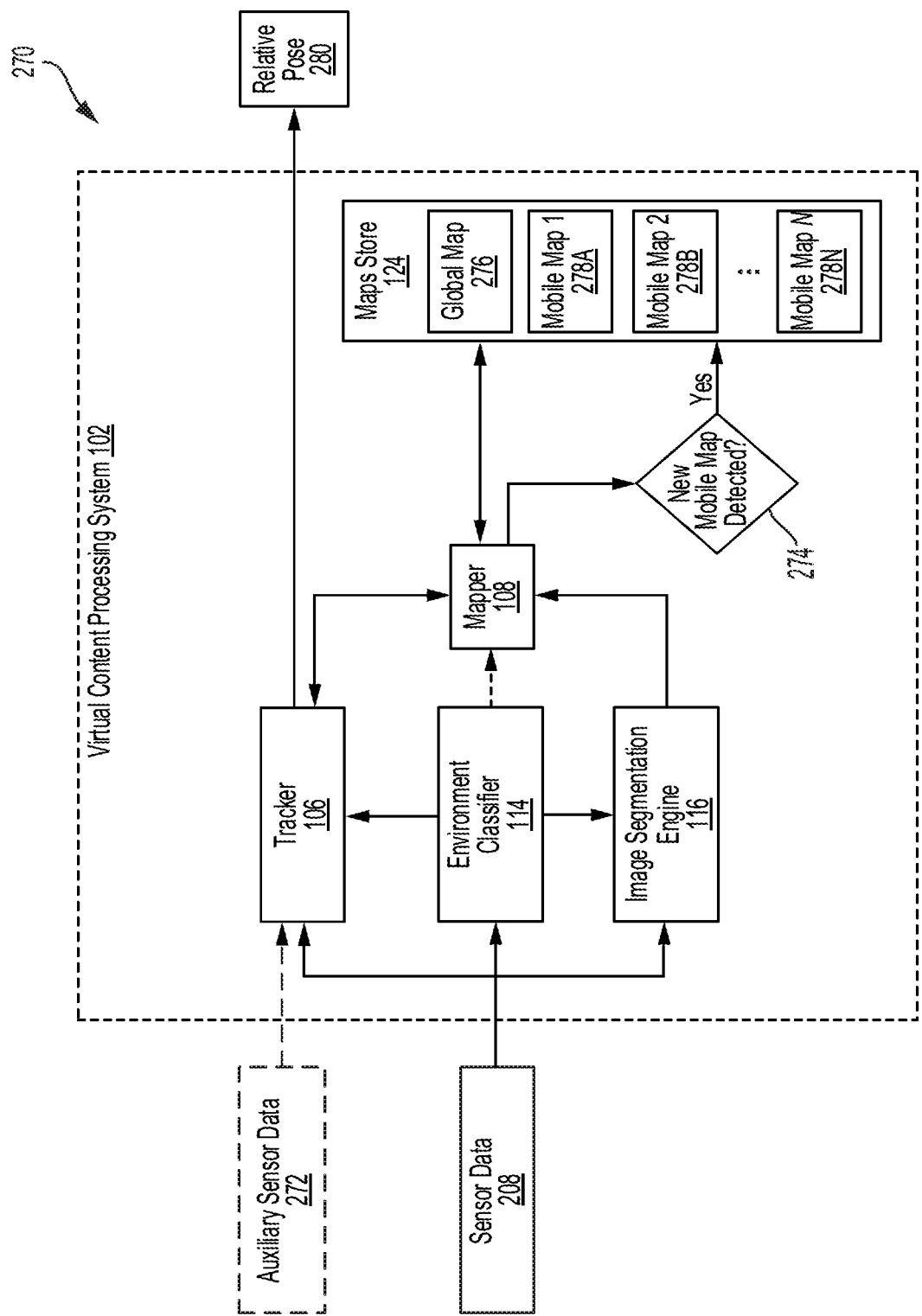
FIG. 2C illustrates a diagram of a process 270 for estimating poses and managing multiple maps, in accordance with some examples.

FIG. 2C illustrates a diagram of a process 270 for estimating poses and managing multiple maps. In this example, the tracker 106 can receive at least a portion of the sensor data 208 to compute a relative pose 280 of the user. The portion of the sensor data 208 can include, for example, measurements from IMU sensors 132 on a device associated with the user, such as an HMD worn by the user. In some cases, the portion of the sensor data 208 can also include measurements from IMU sensors 132 on the mobile platform and/or data from other sensors, such as radar returns, GPS information, image data, etc. In addition, the tracker 106 can optionally (as denoted by the dashed outline of block 272) receive auxiliary sensor data 272 for computing the relative pose 280 of the user. The auxiliary sensor data 272 can include, for example, IMU sensor data from IMU sensors 132 on the mobile platform, image data from one or more image sensors 134 on the mobile platform, odometry information associated with the mobile platform, etc.

The tracker 106 can also use a classification of an environment received from the environment classifier 114 as well as one or more maps 276, 278A, 278B, 278N received from the mapper 108 to generate the relative pose 280 of the user. The classification of the environment can identify and/or classify an environment associated with the user, such as a mobile platform and/or an environment outside of the mobile platform. The tracker 106 can use the classification of the environment and the one or more maps to estimate the pose (280) of the user relative to one or more maps that are applicable to the user in the current context or environment associated with the user (e.g., the current mobile platform where the user is located and/or the environment outside of the current mobile platform). The classification of the environment can help the tracker 106 identify, select, and/or apply the appropriate or relevant maps for estimating the relative pose 280 of the user.

The one or more maps 276, 278A, 278B, 278N can include a global map (e.g., a map of an outside environment) and/or one or more mobile maps associated with one or more mobile platforms. The one or more maps 276, 278A, 278B, 278N can be stored on, and retrieved from, the maps store 124. In some cases, some or all of the one or more maps 276, 278A, 278B, 278N can be generated by the mapper 108 based on the sensor data 208, tracking information provided by the tracker 106, and/or one or more segmented images provided by the image segmentation engine 116. The one or more segmented images can be based on one or more images of an environment associated with the user. The one or more segmented images can mark or identify regions in the one or more images that correspond (e.g., match or represent) to a particular map or environment.

Moreover, the classification of the environment can be generated by the environment classifier 114 based on image data (e.g., from the sensor data 208) received by the environment classifier 114. In some examples, the environment classifier 114 can process one or more images from the sensors data 208 using a neural network and/or a machine learning algorithm to classify an environment identified based on the one or more images.

The environment classifier 114 can also use the classification result to determine a probability that the user has entered a new mobile platform associated with a different or new mobile map.

Also, the image segmentation engine 116 can receive an image (e.g., from the sensor data 208) of an environment associated with the user (e.g., an image of the environment inside and/or outside of a mobile platform), to generate a segmented image and mark or identify regions in the image that correspond (e.g., match or represent) to a particular map or environment. In some cases, the image segmentation engine 116 can also receive the classification result from the environment classifier 114 and use the classification result to generate the segmented image and/or mark or identify the regions in the image that correspond to a particular map or environment.

The mapper 108 can receive the segmented image (and/or corresponding information or analysis) to generate, select and/or retrieve one or more maps (276, 278A, 278B, 278N) from the map store 124. In some cases, the mapper 108 can also use tracking information from the tracker 106 to generate, select and/or retrieve the one or more maps from the maps store 124.

In some cases, a map previously selected and/or used for a user may no longer be applicable. For example, if a user moves from one mobile platform to a different mobile platform, the mobile map applicable to the user prior to moving to the different mobile platform will no longer be applicable or accurate. Accordingly, to ensure accurate use of maps, the mapper 108 can detect when the user has entered a new or different mobile platform and/or mobile map. The mapper 108 can use the segmented image (and/or information from the segmented image) from the image segmentation engine 116 to determine at block 274 whether a new map (e.g., a new mobile map and/or mobile platform) has been detected. In some implementations, the mapper 108 can also use tracking information from the tracker 106 and/or classification information from the environment classifier 114 to detect a new map when the user enters a new mobile platform or environment.

The segmented image (and/or associated information), the tracking information from the tracker 106, and/or the classification from the environment classifier 114 can enable the mapper 108 to determine a probability that the user has entered a new map or environment.

In some examples, the mapper 108 can detect a new map when it identifies a contradiction between sensor data (e.g., IMU sensor samples) associated with a user's current context or environment and geometric constraints computed by tracking a subset of map points. Also, in some cases, when determining whether a new map has been detected, the mapper 108 and/or tracker 106 can verify if map points from a hypothesized map can be successfully tracked.

In some cases, the mapper 108 can detect a presence of multiple models or maps. For example, the mapper 108 can try to fit sensor data (e.g., 208) to multiple models or maps. A successful fit of the sensor data can imply a presence of multiple maps. In some examples, the mapper 108 can embed metadata in a map, such as a global map (e.g., 276), to indicate a presence of multiple mobile maps within the map. For example, a global map of a building having multiple elevators can be embedded with metadata indicating a presence of multiple mobile maps (associated with the multiple elevators) in the global map of the building.

Returning to block 274, if the mapper 108 detects a new map, the mapper 108 can retrieve the new map from the maps store 124 and provide the new map to the tracker 106 for use in computing the relative pose 280 of the user. In some cases, if the mapper 108 determines that the user has entered a new mobile platform or environment and a corresponding or matching map is not available in the maps store 124, the mapper 108 can create a new map for the new mobile platform or environment. The mapper 108 can generate a new map using the sensor data 208, features tracked based on the segmented image from the image segmentation engine 116, classification information from the environment classifier 114, tracking information from the tracker 106, auxiliary sensor data 272, and/or any other sensor and/or mapping data.

Figure 3:
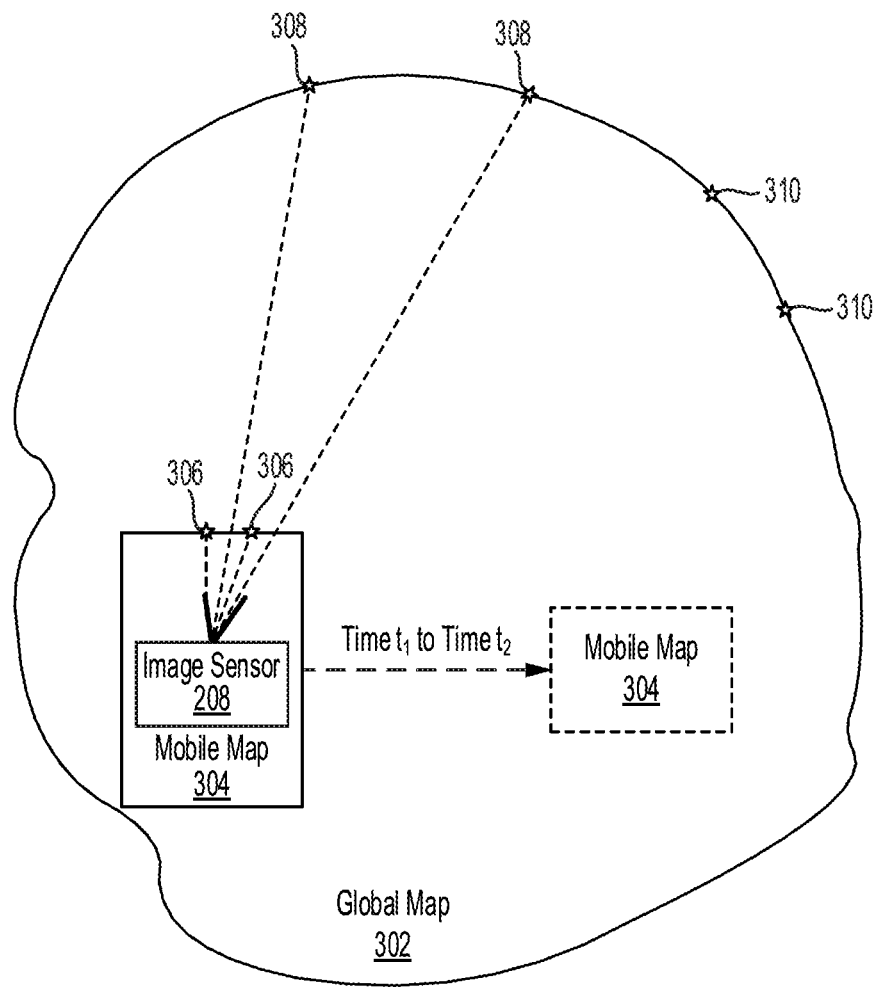
FIG. 3 illustrates a diagram of an example mobile map moving within a global map, in accordance with some examples.

FIG. 3 illustrates a diagram of an example mobile map 304 moving within a global map 302. The mobile map 304 can represent a mobile platform, such as a vehicle, an elevator, an aircraft, a vessel, a conveyance, or any other moving platform. The global map 302 can represent an environment outside of the mobile map 304 and/or the mobile platform associated with the mobile map 304. For example, the mobile map 304 can represent an elevator and the global map 302 can represent a building where the elevator is located. As another example, the mobile map 304 can represent a car and the global map 302 can represent an environment outside of the car (and/or where the car is located or traveling), such as a street, a neighborhood, a parking lot, etc.

In this example, at time $t_1$, the mobile map 304 is at a first location within the global map 302. While the mobile map 302 is at the first location, an image sensor 208 within the mobile map 304 can detect features 306 within the mobile map 304 and features 308 outside of the mobile map 304 but within the global map 302. Additional features 310 within the global map 302 may not be visible from the mobile map 304 and/or within a detectable distance of the image sensor 208. Thus, while the mobile map 302 is at the first location, the image sensor 208 has not detected or tracked the features 310 out of range or visibility.

The image sensor 208 can continue tracking the features 306 and 308 while the mobile map is at the first location and the features 306 and 308 are within range and visibility. At time $t_2$, the mobile map 304 can move to a second location within the global map 302. When the mobile map 302 moves to the second location, the image sensor 208 can come within range or visibility of the features 310 previously out of range and visibility. Accordingly, time $t_2$, the image sensor 208 may be able to detect and track the features 310 within the global map 302. The image sensor 208 can thus continue to track features within the global map 302 and the mobile map 304 even as the mobile map 304 moves within the global map 302.

The tracked features can be used to adapt relative pose information used to provide virtual content and XR experiences to a user within a mobile platform associated with the mobile map 304. The tracked features and the adapted relative pose information can be used to ensure that content displayed to a user within the mobile map 304 adapts to the movement of the mobile map 304, allowing the content to match the perceived motion of the user when the mobile platform associated with the mobile map 304 moves.

Figure 4B:
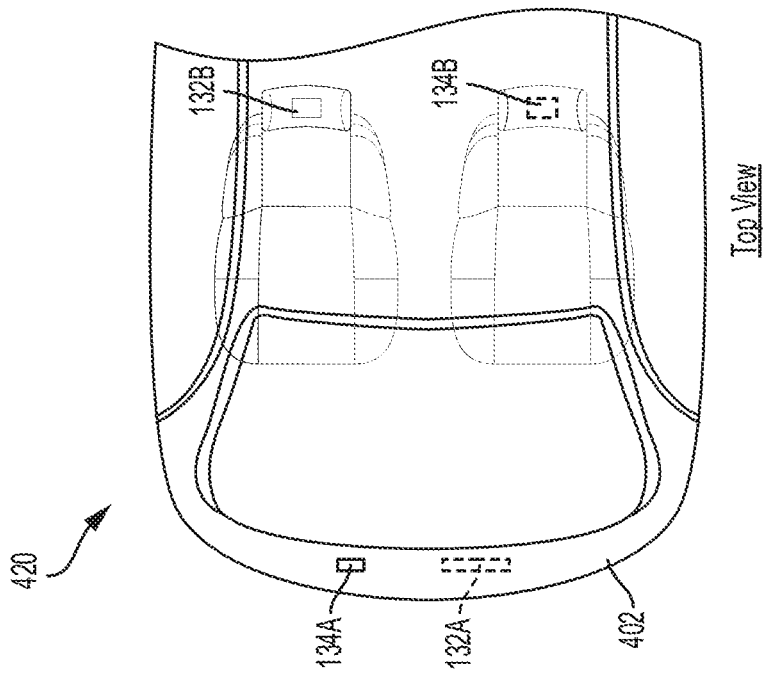
FIG. 4B illustrates a top view of a mobile platform configured with sensors for calculating relative pose information and providing an extended reality experience to a user on a mobile platform, in accordance with some examples.
Figure 4A:
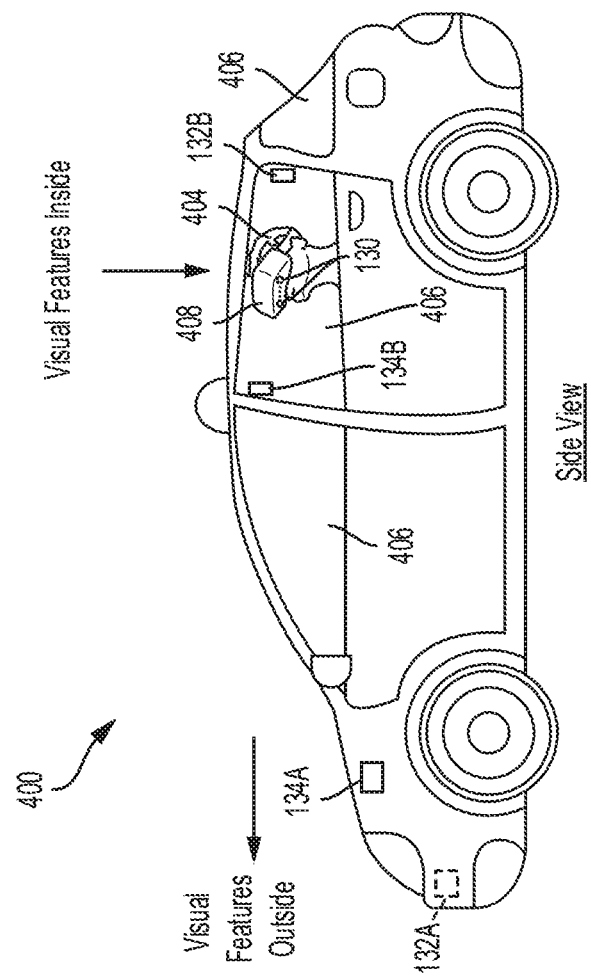
FIG. 4A illustrates a side view of a mobile platform configured with sensors for calculating relative pose information and providing an extended reality experience to a user on a mobile platform, in accordance with some examples.

FIG. 4A illustrates a side view 400 of a mobile platform 402 configured with sensors 132 and 134 for calculating relative pose information and providing an XR experience to a user 404 on the mobile platform 402. As can be seen in the side view 400, a user 404 wearing an HMD 408 is located within the mobile platform 402. In this example, the mobile platform 402 is a car. Moreover, the HMD 408 is provided for explanation purposes as a non-limiting example of a device that can be associated with the user in the mobile platform and that can be used to provide an XR experience to the user. To illustrate, other example devices can include, without limitation, a tablet computer, a mobile phone, a laptop computer, a portable electronic system (e.g., a portable game system, a portable display system, etc.), a smart wearable device (e.g., a smart watch, smart goggles, etc.), a smart television, compute elements in the car 402, etc.

To collect motion metrics, location information, position information, etc., for calculating relative pose information and presenting realistic XR experiences to the user 404, the car 402 can include various sensors (130) inside and/or outside of the car 402. In addition, in some examples, a computing device (e.g., 408) located in the car 402 and associated with the user 404 (e.g., the HMD 408 in this example) can also include one or more sensors 130 for calculating and obtaining such motion metrics, location information, position information, etc. For example, the HMD 408 worn by the user 404 in the car 402 can include one or more sensors 130. In one illustrative example, one or more sensors 130 on the HMD 408 can include an IMU sensor (132) and/or an image sensor (134).

Further, in the example shown in FIG. 4A, the sensors on the car 402 can include IMU sensors 132A, 132B and image sensors 134A, 134B. In particular, the car 402 can include an IMU sensor 132A mounted on (and/or anchored to) one location (e.g., an outside or external location, an internal location, etc.) of the car 402 and an IMU sensor 132B mounted on (and/or anchored to) a different location of the car 402 (e.g., mounted on or anchored to headrests, seats, an internal portion of a door, the car roof, the dash, an internal region of a window 406, etc.). The IMU sensor 132A can be optional, as denoted by the dashed outline of block 134A. The car 402 can also include image sensors 134A and 134B on different locations of the car 402.

The IMU sensors 132A and 132B on the car 402 can calculate motion parameters associated with the car, such as, for example and without limitation, a velocity of the car 402, an acceleration of the car 402, a direction or trajectory of the car 402, an altitude of the car 402, a location of the car 402, an angular rate or velocity of the car 402, a motion of the car 402, an orientation of the car 402, a proximity or range of the car 402 to one or more other objects, etc. The motion parameters calculated by the IMU sensors 132A and 132B can be relative to the external environment of the car (e.g., the road, objects outside of the car, etc.) and/or the user 404 (and/or HMD 408). Moreover, the motion parameters calculated by the IMU sensors 132A and 132B can be used to calculate a pose of the car 402 (e.g., relative to an outside of the car 402); calculate a pose of the user 404 (e.g., relative to the car 402 and/or an outside of the car 402); identify features in, and/or characteristics of, an interior and/or an outside environment of the car 402; identifying and/or correcting drift or noise associated with other sensors, etc.

The image sensors 134A and 134B can capture images (e.g., image data) of one or more objects, scenes, environments, etc. For example, the image sensor 134A can be used to capture one or more images of objects, features, scenes, or environments outside of the car 402, and the image sensor 134B can be used to capture one or more images of objects, features, scenes, or environments inside of the car 402. In some examples, the image sensor 134B can capture one or more images of an inside environment of the car 402 and/or one or more images of one or more features inside of the car 402. In one illustrative example, the image sensor 134B can be used to capture one or more images of the user 404 and/or the HMD 408, which can be used to calculate a head pose of the user 404 and/or correct drift or noise experienced by the IMU sensors 132A and 132B (and/or a sensor (130) on the HMD 408), as previously explained. In another illustrative example, the images captured by the image sensor 134B can be used to identify features in, and/or characteristics of, an interior of the car 402; identify features outside of the car 402; etc.

The one or more sensors 130 on the HMD 408 can be used to calculate motion parameters associated with the user 404, such as, for example and without limitation, a movement of the user 404, a position of the user 402, an angular rate or velocity of the user 404, an acceleration of the user 404, an orientation of the user 402, and/or any other motion or location information associated with the user 404. In some examples, the motion parameters can be relative to the car 402 and/or the external environment of the car (e.g., the road, objects outside of the car, etc.). The motion parameters calculated by the one or more sensors 130 on the HMD 408 can be used to calculate a relative pose of the user 404. In some cases, the motion parameters can also be used to identify features in, and/or characteristics of, an interior of the car 402; identify features outside of the car 402 and visible from the car 402, identifying and/or correcting drift or noise associated with other sensors; etc.

In some examples, the one or more sensors 130 on the HMD 408 can include an image sensor 134 for capturing image data. The image sensor 134 in these examples can capture images of one or more objects, scenes, features, and/or environments surrounding the user 404, such as an interior of the car 402 (and/or a portion thereof), one or more features in the car 402, one or more objects in the car 402, one or more objects outside of the car that are visible from the inside of the car 402, a scene or environment outside of the car that is visible from the inside of the car 402, etc. The images can be used when determining a pose of the user 404; identifying features in, and/or characteristics of, an interior of the car 402; identifying and/or correcting drift or noise associated with other sensors; etc.

In some examples, the data from the sensors 132A-B and 134A-B on the car 402 and/or the sensors 130 on the HMD 408 can be compared to determine pose information (e.g., a pose of the car 402, a pose of the user 404, etc.); identify features inside and/or outside of the car 402; correct drift or noise in one or more sensors; generate and/or select a mobile map representative of the environment, scene, and/or features in the car 402; etc. Also, in some examples, the data from the sensors 132A-B and 134A-B on the car 402 and/or the sensors 130 on the HMD 408 can be fused for greater accuracy in calculating pose information, correcting drift or noise from sensors, generating or selecting a mobile map for the car 402, etc.

In some implementations, one or more windows 406 of the car 402 can include embedded (transparent) displays or HUDs for displaying virtual content to the user 404. For example, when presenting virtual content and/or XR experiences to the user 404, the virtual content processing system 102 can project or render the virtual content and/or XR content on one or more displays or HUDs on one or more windows of the car 402.

FIG. 4B illustrates a top view 420 of the mobile platform 402. In this example, the car 402 includes an image sensor 134A on a front of the car 402, and optionally (as denoted by the dashed outline of block 132A) includes an IMU sensor 132A on the front of the car 402. The image sensor 134A can capture one or more images of one or more objects, scenes, environments, etc., outside of the car 402. The IMU sensor 132A can calculate motion parameters for the car 402.

In addition, the car 402 includes an IMU sensor 132B on an interior of the car 402. In this example, the IMU sensor 132B is mounted on, or anchored to, a headrest of a seat in the car 402. The IMU sensor 132B can be used to calculate motion parameters associated with the car 402 and/or the user 404. In some examples, the car 402 can also include an image sensor 134B on an interior of the car 402. In this example, the image sensor 134B is mounted on, or anchored to, a headrest of another seat in the car 402. The image sensor 134B can be used to capture images of one or more objects, scenes, environments, features, etc., visible from inside of the car 402. In some cases, the image sensor 134B can also be used to correct sensor data and/or drift or noise in other sensors.

Figure 5:
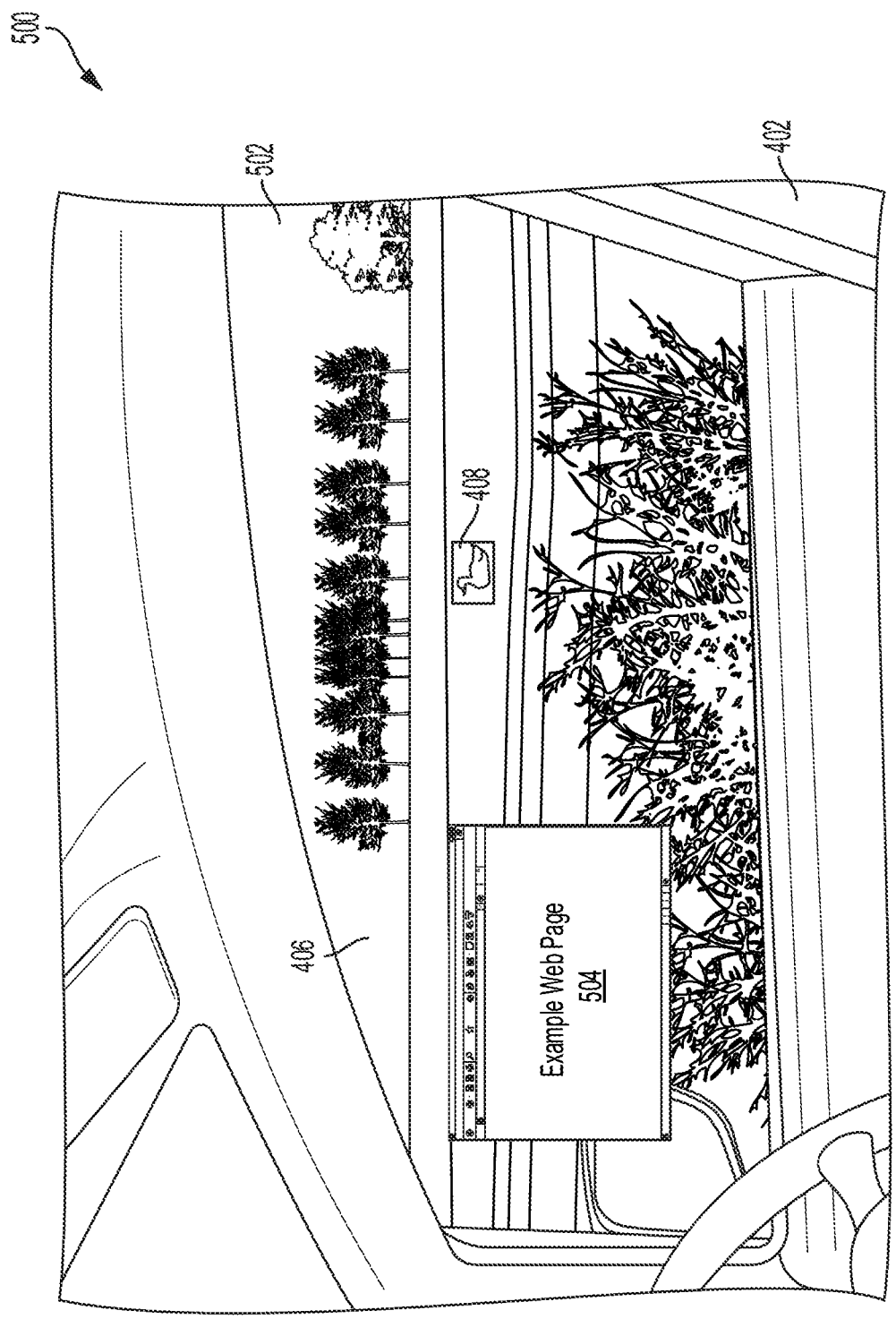
FIG. 5 illustrates an example extended reality experience provided to a user on a car, in accordance with some examples.

FIG. 5 illustrates an example XR experience 500 provided to a user (e.g., 404) on the car 402. In this example, a virtual image 504 of an Internet browser is anchored to a window 406 of the car 402 and displayed on the window 406. The window 406 in this example can include an embedded display. The virtual image 504 is a non-limiting example of content that can be displayed on the window 406. Other examples can display other types of virtual content on the window 406 (either in addition to or instead of the virtual image 504), such as a virtual video, a virtual object, a virtual game, a virtual simulation, a virtual environment, a virtual overlay, a popup billboard or advertisement, interactive virtual content, a virtual image of one or more other objects, etc.

In addition, a virtual object 408 is anchored to a location within an external environment 502 that is outside of the car 402 and visible from the car 402. The virtual object 408 can be rendered and/or displayed to appear or be perceived by the user as if the virtual object 408 is located in the particular location within the external environment 502. In some cases, the virtual object 408 can appear or be perceived as a real or physical object within the external environment 502.

Figure 6:
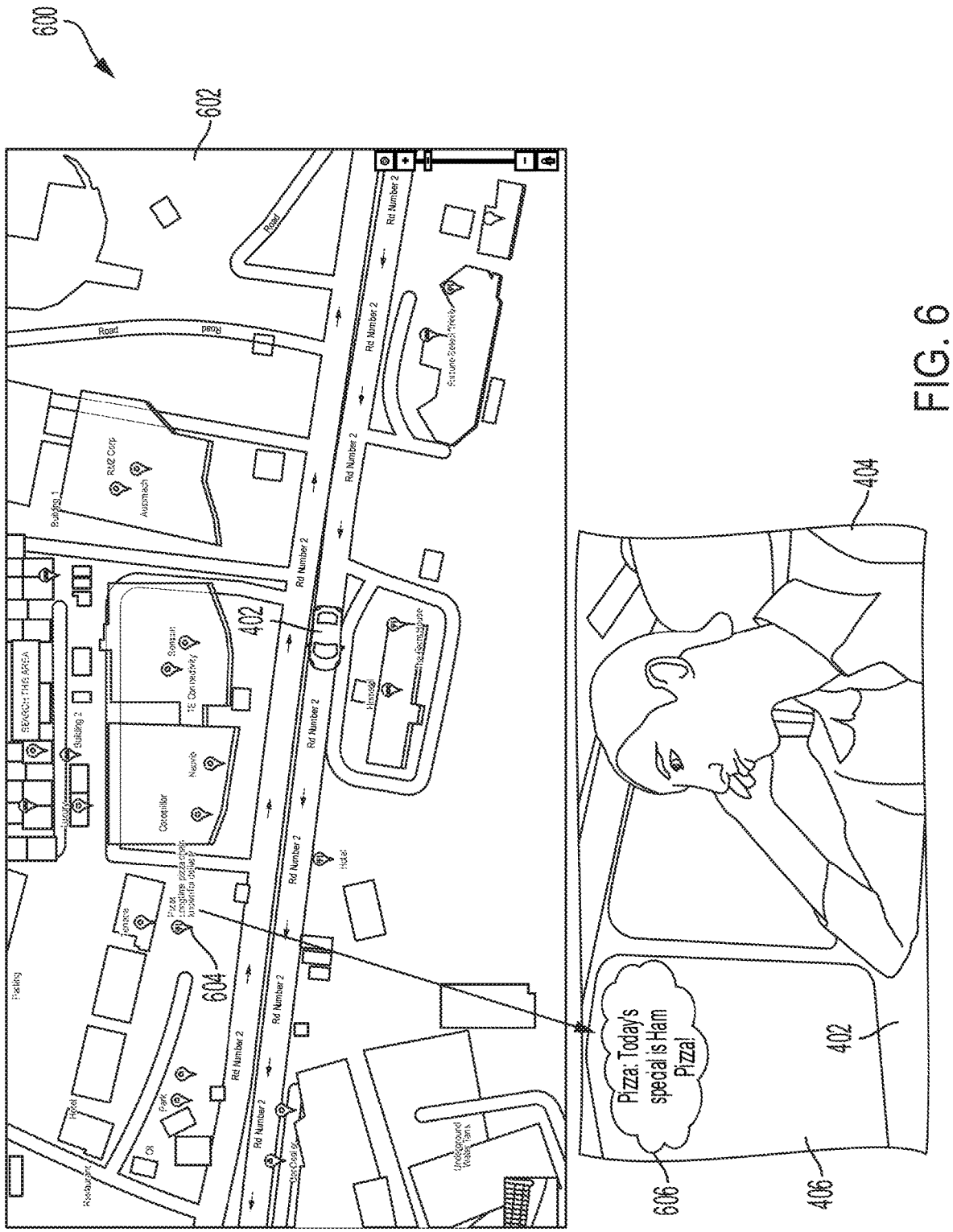
FIG. 6 illustrates another example extended reality experience provided to a user in a car, in accordance with some examples.

FIG. 6 illustrates an example augmented reality experience 600 provided to the user 404 in the car 402. A map 602 illustrates a geographic location, including landmarks and roads, where the car 402 is traveling. As the car 402 approaches an establishment 604 in the map 602, virtual content 606 can be rendered and/or displayed for the user 404 on the window 406 of the car 402. The virtual content 606 in this example can be associated with the establishment 604 that the car 402 is approaching. For example, the virtual content 606 can include a popup advertisement or billboard for the establishment 604, such as a sale advertisement or promotion. The virtual content 606 can augment the external or outside environment visible to the user 404 in the car 402. For example, the virtual content 606 can appear to the user 404 as though the virtual content 606 is part of, or located in, a region of the external or outside environment. In this sense, the virtual content 606 can augment the real or physical world visible to the user 404 from the car 402.

The virtual content 606 can be anchored to a specific region in a mobile map of the car 402 and/or a global map of the external or outside environment, and adapted to be consistent with (and/or account for) the motion of the car 402 and/or the user 404. For example, the virtual content 606 can be anchored to a point in a mobile map of the car 402 corresponding to the window 406. The pose information calculated as previously described can be used to properly or accurately anchor and display the virtual content 606 to appear realistically part of or mixed with the exterior or outside environment. Moreover, the pose information and sensor data can be used to accurately track and adapt the position of the virtual content 606 to match the motion of the car 402 and/or the user 404.

As the car 402 continues to travel, the virtual content 606 can be removed (e.g., once the virtual content 606 and the associated establishment 604 is less relevant to the location of the car 402 and/or further away from the establishment 604). Moreover, a new virtual content or experience can be presented to the user 404 as the car 402 travels, where the new virtual content or experience is selected or configured to be more relevant or integrated with a new location and/or outside environment associated with the car 402. In some examples, the virtual content 606 and/or the new virtual content or experience can be selected and/or presented to the user automatically by the virtual content processing system 102 based on one or more factors, such as a user preference, a user profile, a user history, a current or predicted location of the car 402, a traveling route associated with the user 404, a proximity of the car 402 to one or more objects or establishments, etc. In other examples, the virtual content 606 and/or the new virtual content or experience can be selected and/or presented to the user 404 based on a manual input or request by the user 404. For example, the user 404 can provide an input or request to the virtual content processing system 102 to display the virtual content 606 and/or the new virtual content or experience.

Figure 7:
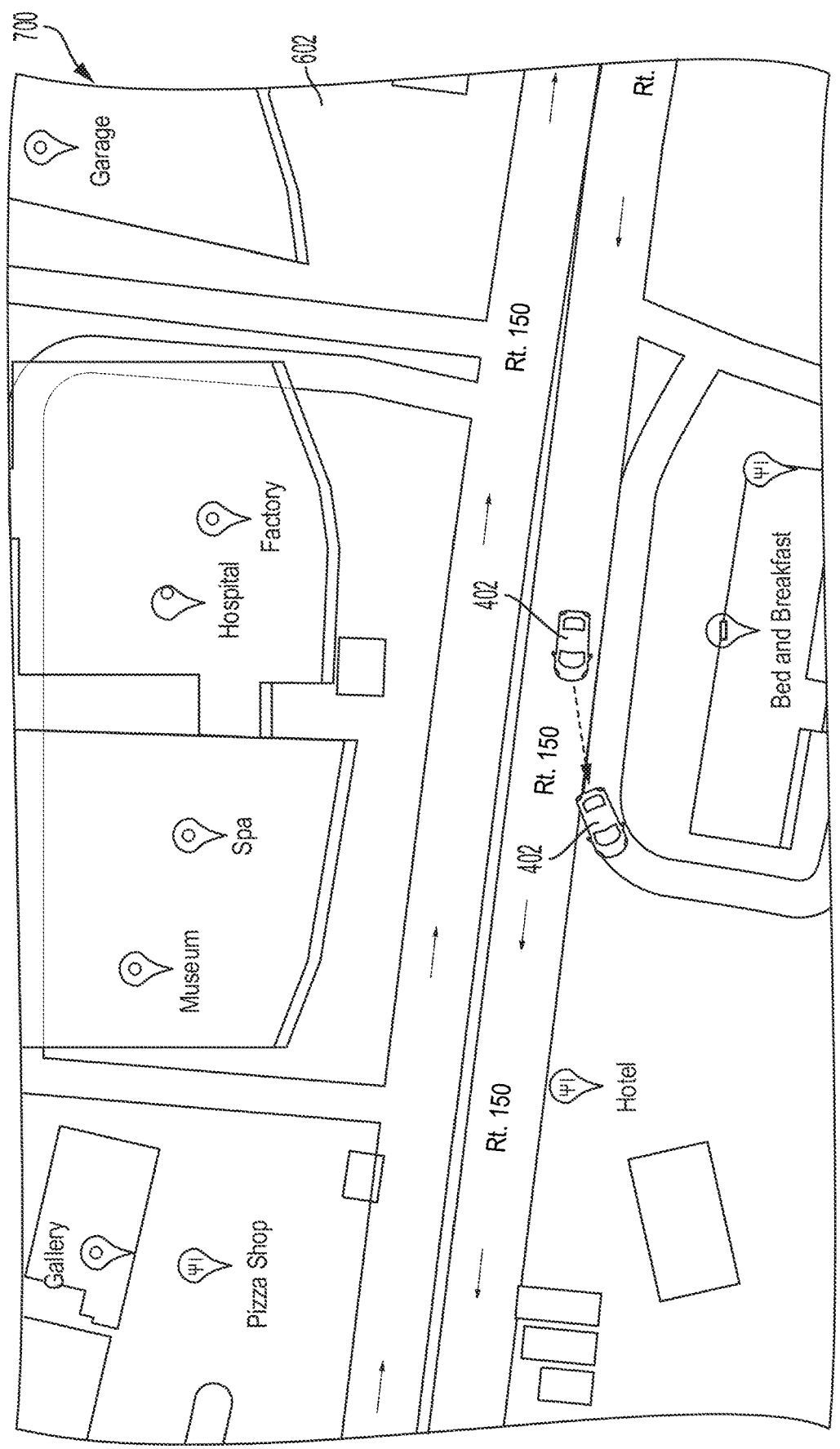
FIG. 7 illustrates a view of a car on a map traveling and changing a route or direction, in accordance with some examples.

FIG. 7 illustrates a view 700 of a car 402 on a map 602 traveling and changing a route or direction. When the car 402 changes direction, the virtual content processing system 102 can attempt to detect or identify the change in direction and the new location or position of the car 402. In some examples, the position of the car 402 can be estimated or approximated using a GPS device in conjunction with the map 602. The GPS device can be implemented or mounted on the car 402 and/or a device associated with the user 404, such as HMD 408.

In some cases, the map 602 and the data from the GPS device may not be sufficient to accurately or clearly estimate the new location or position of the car 402. For example, when the car 402 exits a freeway, the map 602 and data from the GPS device may not be sufficient to accurately detect or estimate the change of direction and/or new location of the car 402. Accordingly, in some examples, one or more sensors 130 can be implemented for disambiguation, to better estimate or approximate the new location (and/or direction) of the car 402. In some cases, the one or more sensors 130 used for disambiguation can include one or more IMU sensors 132. The data from the one or more IMU sensors 132 can be combined with the GPS data and the map information to better estimate or approximate the new location (and/or direction) of the car. The one or more IMU sensors 132 can be located on the car 402 and/or a device associated with the user 404, such as the HMD 408.

In some examples, other types of sensors can also be implemented to estimate the new location and/or direction of the car 402, either in addition to or instead of the one or more IMU sensors 132. For example a magnetometer can be implemented (e.g., on the car 402 and/or the HMD 408) to an approximate heading associated with the car 402. Moreover, in some implementations, use of the one or more sensors 130 (e.g., in combination with the GPS device and maps information) for estimating the new location and/or direction of the car 402 can be implemented or used for a short duration. For example, the one or more sensors 130 can be used for disambiguation until a location and/or direction of the car 402 is more accurately established. Once the location and/or direction of the car 402 has been more accurately established, the system can revert to using the GPS device and map information for estimating and/or tracking a location and/or direction of the car 402. In other examples, the one or more sensors 130 can be used for a longer duration (or for as long as the virtual content processing system 102 is in use) to track and estimate the location and/or direction of the car 402.

By more accurately estimating the location and/or direction of the car 402, the virtual content processing system 102 can provide more accurate and relevant XR experiences and/or updates to the user. For example, when the car 402 changes direction as seen in FIG. 7, the virtual content processing system 102 can use the new estimated location and/or direction of the car 402 to update the relative display location of virtual content presented to the user 404 and/or update the configuration or content presented to the user 404.

Figure 8A:
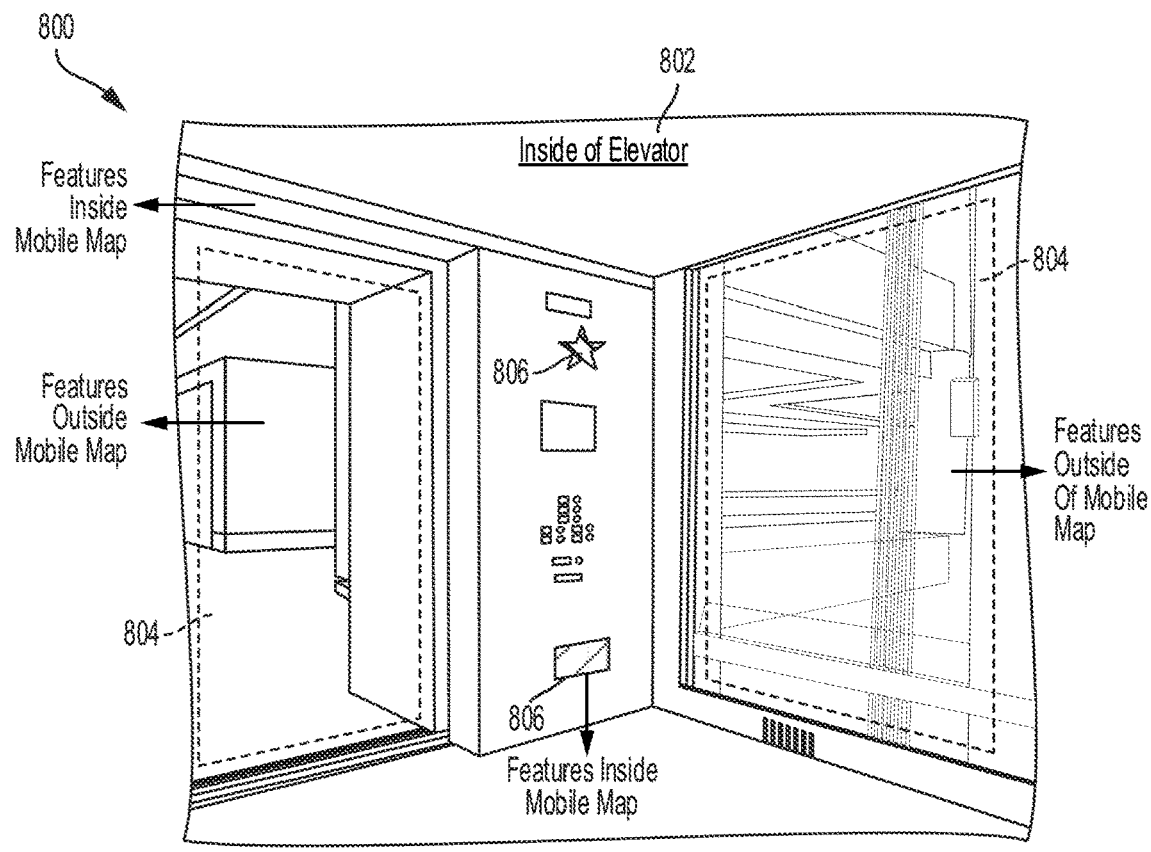
FIG. 8A illustrates an example view of a mobile platform, in accordance with some examples.

FIG. 8A illustrates an example view 800 of a mobile platform 802. In this example, the mobile platform 802 is an elevator. The view 800 depicts an inside view of the elevator 802 and features 804 and 806 visible from the elevator 802. The features 804 can include visual features outside of a mobile map associated with the elevator 802. For example, the features 804 can include features of an outside of the elevator 802 (e.g., features in a view of the outside environment). Moreover, the features 804 can represent features on a global map associated with the elevator 802, which maps the outside view or environment visible from the elevator 802.

The features 806 can include visual features inside of the mobile map of the elevator 802. For example, the features 806 can include specific features inside of the elevator 802 and/or contained in a mobile map of the elevator 802.

The features 804 and 806 can be tracked based on sensors 130 on the elevator 802 and/or a device associated with a user on the elevator, such as an HMD or mobile computing device. In some cases, the features 804 and 806 can be tracked from map points in a mobile map of the elevator 802. For example, instead of using a global map (either in addition to or in lieu of the mobile map) to track the features 804 and 806, the features 804 and 806 may be tracked from only map points inside of the mobile map in order to avoid potential errors in trajectory that may result when tracking features in map points of a global map associated with the elevator 802.

Figure 8B:
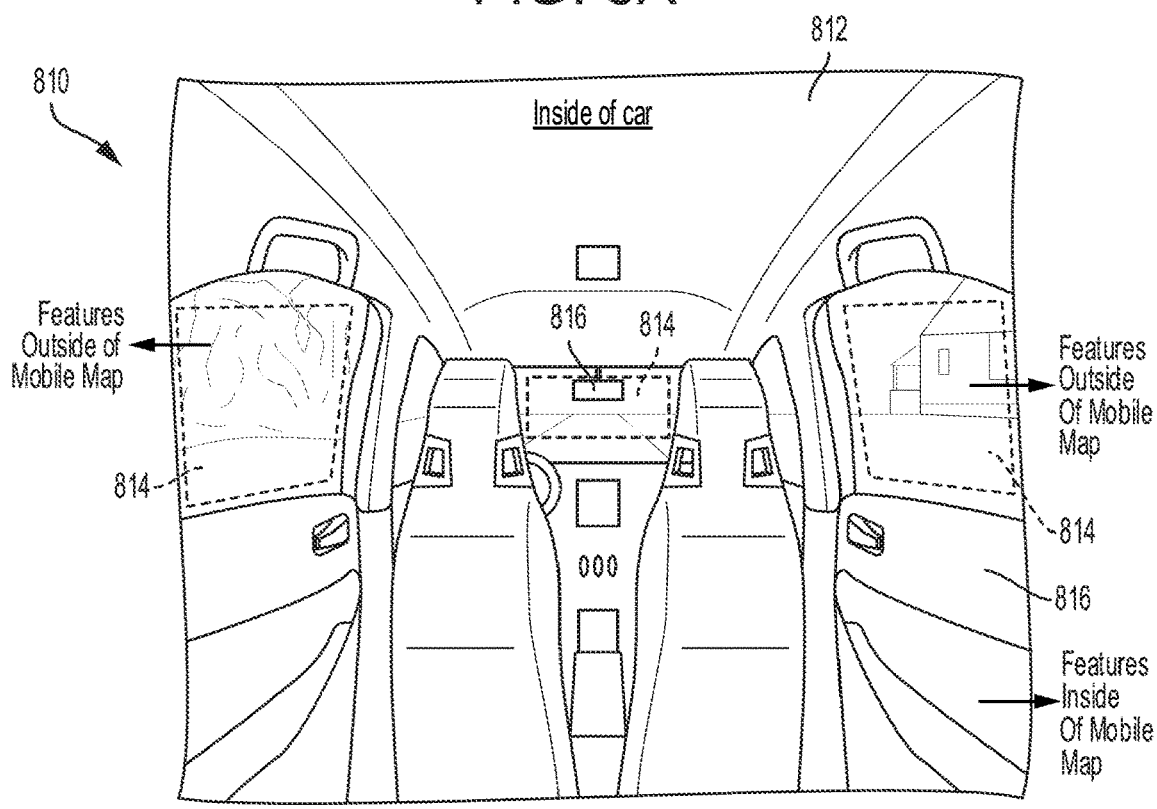
FIG. 8B illustrates another example view of a mobile platform, in accordance with some examples.

FIG. 8B illustrates another example view 810 of a mobile platform 812. In this example, the mobile platform 812 is a car. The view 810 depicts an inside view of the car 812 and features 814 and 816 visible from the car 812. The features 814 can include visual features outside of a mobile map associated with the car 812. For example, the features 814 can include features of an outside of the car 812 (e.g., features in a view of the outside environment). Moreover, the features 814 can represent features on a global map associated with the car 812, which maps the outside view or environment visible from the car 812.

The features 816 can include visual features inside of the mobile map of the car 812. For example, the features 816 can include specific features inside of the car 812 and/or contained in a mobile map of the car 812.

The features 814 and 816 can be tracked based on sensors 130 on the car 812 and/or a device associated with a user on the elevator, such as an HMD or mobile computing device. In some cases, the features 814 and 816 can be tracked from map points in a mobile map of the car 812. For example, instead of using a global map (either in addition to or in lieu of the mobile map) to track the features 814 and 816, the features 814 and 816 may be tracked from only map points inside of the mobile map in order to avoid potential errors in trajectory that may result when tracking features in map points of a global map associated with the car 812.

Figure 9:
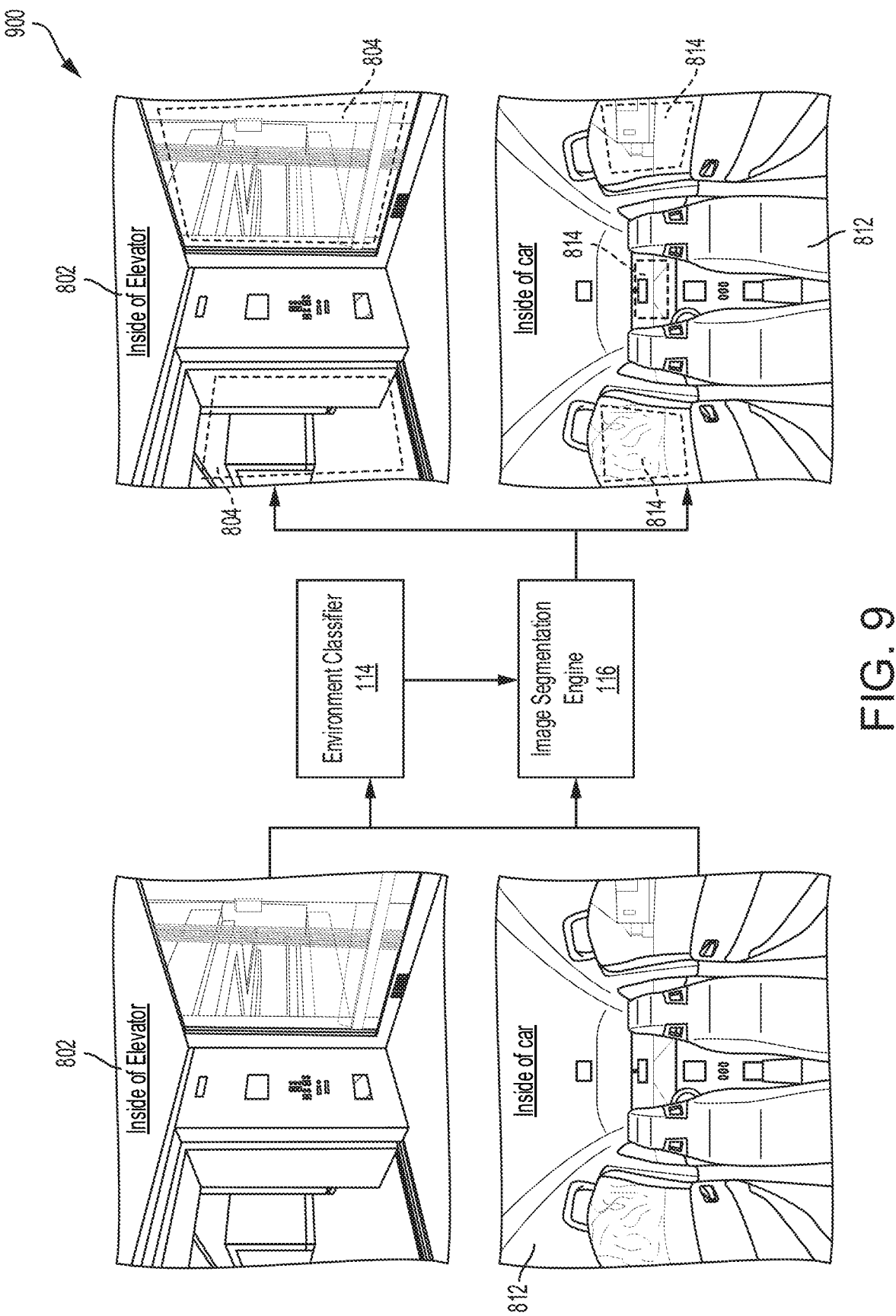
FIG. 9 illustrates a diagram of a scheme for detecting when a user leaves a mobile platform and enters a new mobile platform, in accordance with some examples.

FIG. 9 illustrates a diagram of a scheme 900 for detecting when a user leaves a mobile platform (and/or associated mobile map) and enters a new mobile platform (and/or associated mobile map). In this example, a user located in the elevator 802 leaves and enters the car 812. To detect that the user has entered the new mobile platform (e.g., the car 812), an image of the elevator 802 and an image of the car 812 (e.g., captured by one or more image sensors 134) can be processed by the environment classifier 114 and the image segmentation engine 116.

The environment classifier 114 can analyze the images and generate a classification of the mobile platforms 802 and 812. The classification can be provided to the image segmentation engine 116 which, along with the images, to detect that the user has entered the new mobile platform (e.g., the car 812). Using the classification information from the environment classifier 114, the image segmentation engine 116 can determine which images correspond to which environment and/or mobile platform. The image segmentation engine 116 can partition the images and mark one or more respective regions in the images that correspond to, or match, the mobile maps of the elevator 802 and the car 812.

In this way, the image segmentation engine 116 can determine that the image corresponding to current user's context (e.g., the most recently captured image) matches or corresponds to a new mobile map (e.g., a mobile map of the car 812), and thereby determine that the user has entered a new mobile map or platform. This information will allow the virtual content processing system 102 to update the mobile map used for the user and the tracking of features and/or map points in the applicable mobile map.

In some examples, the environment classifier 114 and the image segmentation 116 can be used to determine whether there is a contradiction between sensor measurements and geometric constraints of the user's current mobile map (e.g., the mobile map of the elevator 802) computed by tracking a subset of map points. Such contradiction between the sensor measurements and the geometric constraints can indicate that the user has entered a different mobile map (e.g., a mobile map of the car 812), as the observations from the sensor data no longer match the previous mobile map (e.g., the mobile map of the elevator 802).

Figure 10:
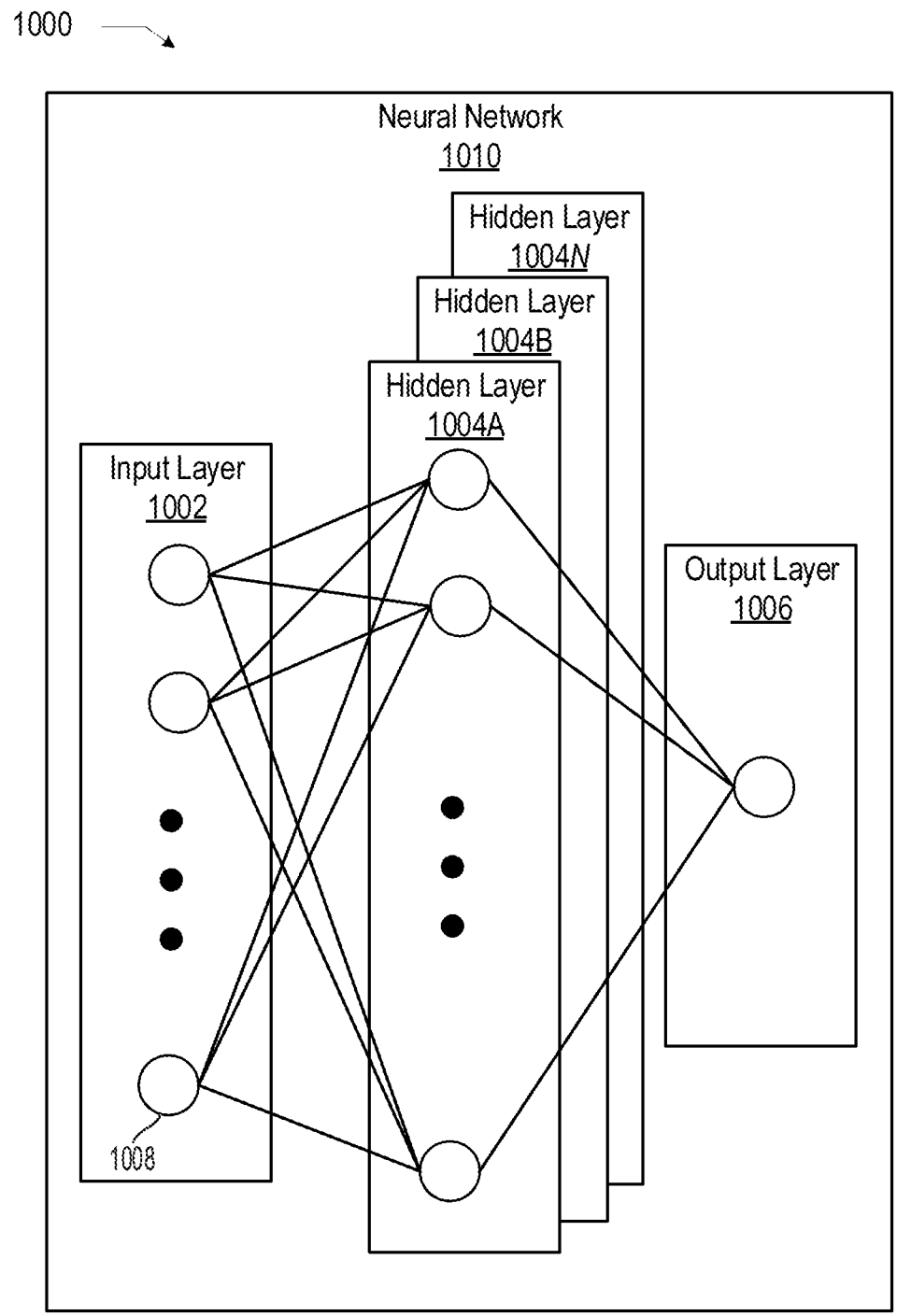
FIG. 10 illustrates an example configuration of a neural network implemented by an environment classifier and/or an image segmentation engine, in accordance with some examples.

FIG. 10 illustrates an example configuration 1000 of a neural network 1010 that can be implemented by the environment classifier 114 and/or the image segmentation engine 116, for example. In this example, the neural network 1010 includes an input layer 1002 which includes input data, such as images (e.g., image data 248) from one or more image sensors 134. The images can capture a view, scene, environment, mobile platform, and/or object associated with one or more mobile maps and/or platforms. In one illustrative example, the input layer 1002 can include data representing the pixels of one or more input images.

The neural network 1010 includes hidden layers 1004A through 1004N (collectively "1004" hereinafter). The hidden layers 1004 can include n number of hidden layers, where n is an integer greater than or equal to one. The number of hidden layers can be made to include as many layers as needed for the given application. The neural network 1010 further includes an output layer 1006 that provides an output resulting from the processing performed by the hidden layers 1004. In one illustrative example, the output layer 1006 can provide a classification and/or localization of one or more objects in an input image. The classification can include a class identifying the type of object or scene (e.g., a car, an elevator, a train, a vessel, an aircraft, or any other object or scene) and the localization can include a bounding box indicating the location of the object or scene.

The neural network 1010 is a multi-layer deep learning network of interconnected nodes. Each node can represent a piece of information. Information associated with the nodes is shared among the different layers and each layer retains information as information is processed. In some cases, the neural network 1010 can include a feed-forward network, in which case there are no feedback connections where outputs of the network are fed back into itself. In some cases, the neural network 1010 can include a recurrent neural network, which can have loops that allow information to be carried across nodes while reading in input.

Information can be exchanged between nodes through node-to-node interconnections between the various layers. Nodes of the input layer 1002 can activate a set of nodes in the first hidden layer 1004A. For example, as shown, each of the input nodes of the input layer 1002 is connected to each of the nodes of the first hidden layer 1004A. The nodes of the hidden layer 1004A can transform the information of each input node by applying activation functions to the information. The information derived from the transformation can then be passed to and can activate the nodes of the next hidden layer (e.g., 1004B), which can perform their own designated functions. Example functions include convolutional, up-sampling, data transformation, pooling, and/or any other suitable functions. The output of the hidden layer (e.g., 1004B) can then activate nodes of the next hidden layer (e.g., 1004/V), and so on. The output of the last hidden layer can activate one or more nodes of the output layer 1006, at which point an output is provided. In some cases, while nodes (e.g., node 1008) in the neural network 1010 are shown as having multiple output lines, a node has a single output and all lines shown as being output from a node represent the same output value.

In some cases, each node or interconnection between nodes can have a weight that is a set of parameters derived from the training of the neural network 1010. For example, an interconnection between nodes can represent a piece of information learned about the interconnected nodes. The interconnection can have a numeric weight that can be tuned (e.g., based on a training dataset), allowing the neural network 1010 to be adaptive to inputs and able to learn as more data is processed.

The neural network 1010 can be pre-trained to process the features from the data in the input layer 1002 using the different hidden layers 1004 in order to provide the output through the output layer 1006. In an example in which the neural network 1010 is used to identify objects or features in images, the neural network 1010 can be trained using training data that includes both images and labels. For instance, training images can be input into the neural network 1010, with each training image having a label indicating the classes of the one or more objects or features in each image (e.g., indicating to the network what the objects are and what features they have).

In some cases, the neural network 1010 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 1010 is trained enough so that the weights of the layers are accurately tuned.

For the example of identifying objects in images, the forward pass can include passing a training image through the neural network 1010. The weights can be initially randomized before the neural network 1010 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 1010, the output can include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1).

With the initial weights, the neural network 1010 is unable to determine low level features and thus cannot make an accurate determination of what the classification of the object might be. A loss function can be used to analyze errors in the output. Any suitable loss function definition can be used.

The loss (or error) can be high for the first training images since the actual values will be different than the predicted output. The goal of training is to minimize the amount of loss so that the predicted output is the same as the training label. The neural network 1010 can perform a backward pass by determining which inputs (weights) most contributed to the loss of the network, and can adjust the weights so that the loss decreases and is eventually minimized.

A derivative of the loss with respect to the weights can be computed to determine the weights that contributed most to the loss of the network. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 1010 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 1010 can represent any other deep network other than a CNN, such as an autoencoder, a deep belief nets (DBNs), a Recurrent Neural Networks (RNNs), etc.

Figure 11:
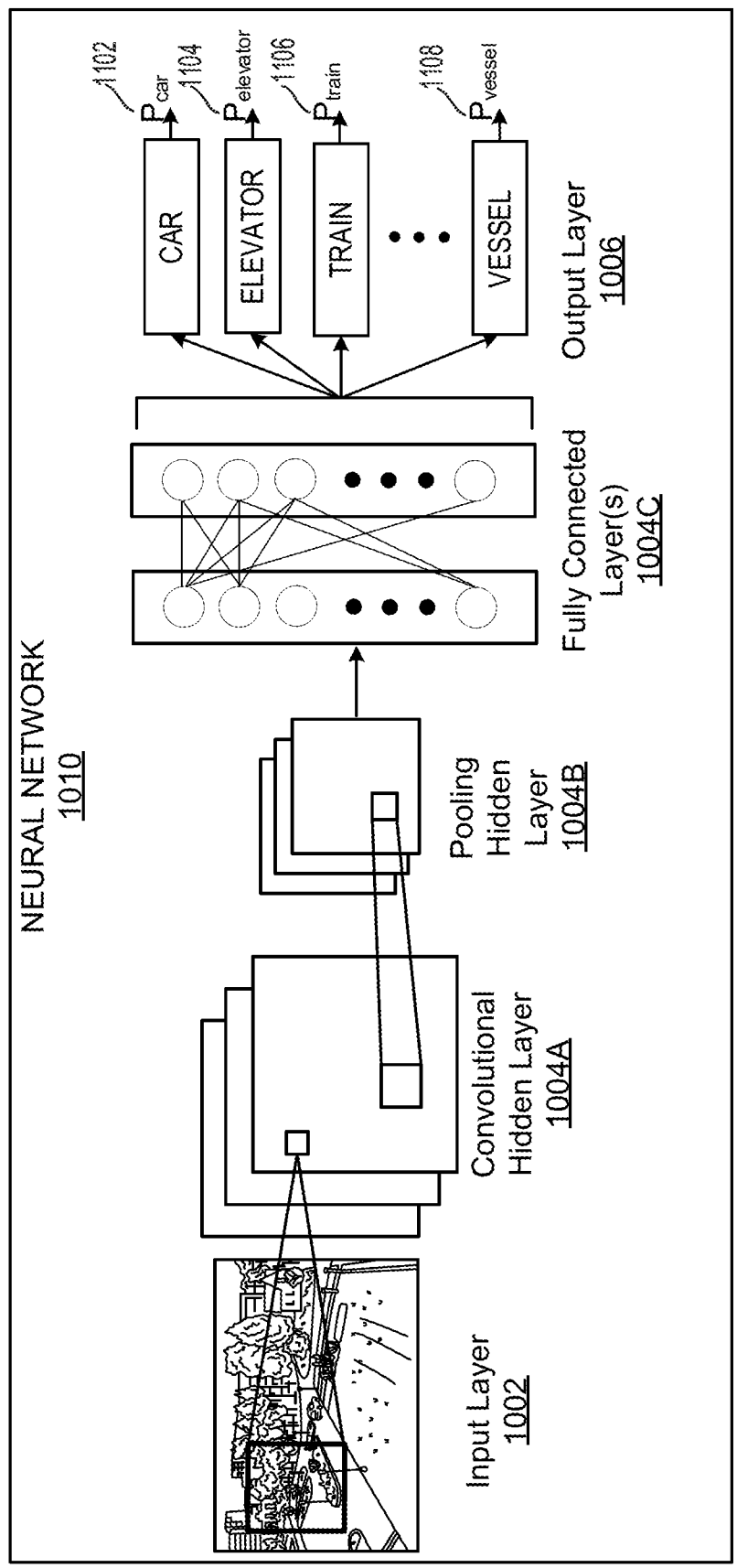
FIG. 11 illustrates an example use of a neural network to perform deep learning and classification, in accordance with some examples.

FIG. 11 illustrates an example use of neural network 1010 configured to perform deep learning. In this example, the neural network 1010 includes an input layer 1002, a convolutional hidden layer 1004A, a pooling hidden layer 1004B, fully connected layers 1004C, and output layer 1006. The neural network 1010 can identify specific object, scene, mobile platform, or environment features (e.g., a car, an elevator, a train, a vessel, a road, bike paths, a lake, a park, a building, a conveyance, etc.) in an image. First, each pixel in the image is considered as a neuron that has learnable weights and biases. Each neuron receives some inputs, performs a dot product and optionally follows it with a non-linearity function. The neural network 1010 can also encode certain properties into the architecture by expressing a single differentiable score function from the raw image pixels on one end to class scores at the other to extract specific features from the image. After identifying objects in the image as specific features of an object, mobile platform or environment, the neural network 1010 can generate a mean score (or z-score) of each feature and take the average of the scores within the user-defined buffer.

In some examples, the input layer 1004A includes data representing an image. For example, the data can include an array of numbers representing the pixels of the image, with each number in the array including a value from 0 to 255 describing the pixel intensity at that position in the array. The image can be passed through the convolutional hidden layer 1004A, an optional non-linear activation layer, a pooling hidden layer 1004B, and fully connected hidden layers 1006 to get an output at the output layer 1006. The outputs 1102, 1104, 1106, 1108 can indicate a class of an object or mobile platform (e.g., a car, elevator, train, vessel) or a probability of classes that best describes the objects in the image.

The convolutional hidden layer 1004A can analyze the image data of the input layer 1002A. Each node of the convolutional hidden layer 1004A can be connected to a region of nodes (pixels) of the input image. The convolutional hidden layer 1004A can be considered as one or more filters (each filter corresponding to a different activation or feature map), with each convolutional iteration of a filter being a node or neuron of the convolutional hidden layer 1004A. Each connection between a node and a receptive field (region of nodes (pixels)) for that node learns a weight and, in some cases, an overall bias such that each node learns to analyze its particular local receptive field in the input image.

The convolutional nature of the convolutional hidden layer 1004A is due to each node of the convolutional layer being applied to its corresponding receptive field. For example, a filter of the convolutional hidden layer 1004A can begin in the top-left corner of the input image array and can convolve around the input image. As noted above, each convolutional iteration of the filter can be considered a node or neuron of the convolutional hidden layer 1004A. At each convolutional iteration, the values of the filter are multiplied with a corresponding number of the original pixel values of the image. The multiplications from each convolutional iteration can be summed together to obtain a total sum for that iteration or node. The process is next continued at a next location in the input image according to the receptive field of a next node in the convolutional hidden layer 1004A. Processing the filter at each unique location of the input volume produces a number representing the filter results for that location, resulting in a total sum value being determined for each node of the convolutional hidden layer 1004A.

The mapping from the input layer 1002 to the convolutional hidden layer 1004A can be referred to as an activation map (or feature map). The activation map includes a value for each node representing the filter results at each locations of the input volume. The activation map can include an array that includes the various total sum values resulting from each iteration of the filter on the input volume. The convolutional hidden layer 1004A can include several activation maps in order to identify multiple features in an image. The example shown in FIG. 11 includes three activation maps. Using three activation maps, the convolutional hidden layer 1004A can detect three different kinds of features, with each feature being detectable across the entire image.

In some examples, a non-linear hidden layer can be applied after the convolutional hidden layer 1004A. The non-linear layer can be used to introduce non-linearity to a system that has been computing linear operations.

The pooling hidden layer 1004B can be applied after the convolutional hidden layer 1004A (and after the non-linear hidden layer when used). The pooling hidden layer 1004B is used to simplify the information in the output from the convolutional hidden layer 1004A. For example, the pooling hidden layer 1004B can take each activation map output from the convolutional hidden layer 1004A and generate a condensed activation map (or feature map) using a pooling function. Max-pooling is one example of a function performed by a pooling hidden layer. Other forms of pooling functions be used by the pooling hidden layer 1004B, such as average pooling or other suitable pooling functions. A pooling function (e.g., a max-pooling filter) is applied to each activation map included in the convolutional hidden layer 1004A. In the example shown in FIG. 11, three pooling filters are used for the three activation maps in the convolutional hidden layer 1004A.

The pooling function (e.g., max-pooling) can determine whether a given feature is found anywhere in a region of the image, and discard the exact positional information. This can be done without affecting results of the feature detection because, once a feature has been found, the exact location of the feature is not as important as its approximate location relative to other features. Max-pooling (as well as other pooling methods) offer the benefit that there are fewer pooled features, thus reducing the number of parameters needed in later layers.

The fully connected layer 1004C can connect every node from the pooling hidden layer 1004B to every output node in the output layer 1006. The fully connected layer 1004C can obtain the output of the previous pooling layer 1004B (which should represent the activation maps of high-level features) and determine the features that correlate to a particular class. For example, the fully connected layer 1004C layer can determine the high-level features that most strongly correlate to a particular class, and can include weights (nodes) for the high-level features. A product can be computed between the weights of the fully connected layer 1004C and the pooling hidden layer 1004B to obtain probabilities for the different classes.

In some examples, the output from the output layer 1006 can include an n-dimensional vector, where n can include the number of classes that the program has to choose from when classifying the object or mobile platform in the image. Other example outputs can also be provided. Each number in the n-dimensional vector can represent the probability the object is of a certain class.

FIG. 12 illustrates an example process 1200 for providing immersive extended reality experiences on moving platforms. In this example, at step 1202, the process 1200 can include obtaining sensor measurements (208) from a plurality of sensors (130) deployed on a mobile platform. The sensor measurements can include motion parameters associated with the mobile platform and a user in the mobile platform. For example, the sensor measurements can include IMU sensor data, image data, radar returns, structured light data, location information, etc. The sensor measurements can provide, for example, a relative velocity of the mobile platform and/or the user, a relative acceleration of the mobile platform and/or the user, a location of the mobile platform and/or the user, an altitude of the mobile platform and/or the user, a trajectory of the mobile platform and/or the user, a relative angular rate of the mobile platform and/or the user, a relative position of the mobile platform and/or the user, motion dynamics of the mobile platform and/or the user, etc.

The plurality of sensors (130) can be located on the mobile platform and/or on a device associated with the user, such as an HMD worn by the user, a mobile device carried by the user, smart wearable device(s) worn by the user, etc. The mobile platform can include any mobile conveyance or transportation system, such as, for example, a vehicle, an elevator, a train, an aircraft, a conveyor belt, a vessel, etc. In some examples, the plurality of sensors (130) can include one or more IMU sensors (132), one or more image sensors (134), one or more radars (136), an odometry device, one or more lidars, a GPS device (138), and/or any other type of sensors.

At step 1204, the process 1200 can include identifying features of the mobile platform and features of an environment outside of the mobile platform. The features of the mobile platform and the environment outside of the mobile platform can be identified and/or tracked based on the sensor measurements (208) and/or location information (204), route information (206), and/or any other information associated with the mobile platform and/or the environment. Moreover, in some examples, the features of the mobile platform and the environment outside of the mobile platform can be identified and/or tracked based on a mobile map of the mobile platform and/or a global map of the environment outside of the mobile platform.

At step 1206, the process 1200 can include tracking, using the sensor measurements (208), a first pose of the mobile platform relative to the environment outside of the mobile platform. At step 1208, the process 1200 can include tracking, using the sensor measurements (208), a second pose of the user relative to the features of the mobile platform. In some examples, at step 1208, the process 1200 can also track the second pose of the user relative to the features of the environment outside of the mobile platform. In some examples, at step 1208, the process 1200 can track the pose of the user relative to the features of the environment outside of the mobile platform either in addition to or in lieu of tracking the pose of the user relative to the features of the mobile platform.

In some cases, the process 1200 can track the second pose of the user relative to the features of the environment outside of the mobile platform (e.g., in addition to tracking the second pose of the user relative to the features of the mobile platform), and discard track data, pose data and/or other data pertaining to the features of the environment outside of the mobile platform in order to reduce noise or information overload caused or exacerbated by the features of the environment outside of the mobile platform. In other cases, the process 1200 can track the second pose of the user relative to the features of the environment outside of the mobile platform (e.g., in addition to, or in lieu of, tracking the pose of the user relative to the features of the mobile platform) for use in anchoring virtual content to one or more features of the environment outside of the mobile platform while taking into account the user's perceived motion.

The first pose of the mobile platform and the second pose of the user can be computed based on the sensor measurements (208) and using one or more tracking models and/or filters, such as the acceleration model (e.g., Equations 1-5), the gyroscope model (e.g., Equations 6-10), the EKF algorithm (e.g., Prediction step 1 and update step 2) previously described, and/or any suitable tracking model(s) or filter(s).

At step 1210, the process 1200 can include tracking a third pose of the user relative to the environment outside of the mobile platform (and/or one or more features of the environment outside of the mobile platform) based on the first pose (e.g., the pose of the mobile platform relative to the environment outside of the mobile platform) and the second pose (e.g., the pose of the user relative to the features of the mobile platform and/or the features of the environment outside of the mobile platform). For example, the process 1200 can use the pose and/or motion of the mobile platform and the pose and/or motion of the user relative to the mobile platform (and/or relative to one or more features of the mobile platform) to determine the third pose of the user relative to the environment outside of the mobile platform (and/or relative to one or more features of the environment outside of the mobile platform).

In some cases, the process 1200 can implement other additional information to calculate the first pose of the mobile platform and the second pose of the user. For example, the process 1200 can implement location information (204), route information (206), user data (202), GIS data, data from an external source (142), map data, and/or any other information associated with the mobile platform and/or the environment. Moreover, in some examples, the process 1200 can calculate or track the first pose of the mobile platform and the second pose of the user based on a mobile map of the mobile platform and/or a global map of the environment outside of the mobile platform.

In some aspects, the process 1200 can further include detecting, using an environment classifier (114) and image data captured by at least one of the plurality of sensors (130), that the user has entered a different mobile platform. The process 1200 can, for example, process an image of a current context or mobile platform associated with the user to classify the environment and/or mobile platform in the image and determine that the image and/or environment captured by the image corresponds to or matches a different mobile platform than a previous mobile platform of the user. In some cases, detecting that the user has entered a different mobile platform can include detecting that the user has entered a different mobile map and/or identifying a different mobile map associated with the different mobile platform.

Moreover, in some aspects, detecting that the user has entered a different mobile platform can include identifying features associated with the different mobile platform, and tracking an additional pose of the user relative to the features associated with the different mobile platform. In some cases, the features can be identified using sensor measurements (e.g., IMU data, image data, map data, etc.) and/or a mobile map associated with the different mobile platform.

In some examples, the process 1200 can also include detecting that the user has exited a mobile platform based on an inconsistency between sensor measurements (208) and geometric constraints computed for the mobile platform. The geometric constraints can be computed by, for example, tracking a subset of points in a map of the mobile platform.

In some implementations, detecting that the user has entered a different mobile platform can include determining whether the sensor measurements fit two or more maps associated with two or more mobile platforms, and when the sensor measurements fit the two or more maps associated with the two or more mobile platforms, determining that a global map of the environment outside of the mobile platform includes the two or more maps associated with the two or more mobile platforms. Here, the process 1200 can determine that the global map (e.g., the global environment associated with the user) includes multiple mobile maps, which the user can enter and exit. In some cases, the process 1200 can include storing, on the global map, an indication that the global map includes the two or more maps associated with the two or more mobile platforms.

In some case, detecting that the user has entered the different mobile platform can include receiving an image of a current environment associated with the user, partitioning, using an image segmentation algorithm, the image into multiple image segments, and based on the multiple image segments, identifying one or more regions in the image that correspond to a map of the different mobile platform. The different mobile platform here can be associated with the current environment. Moreover, in some examples, identifying one or more regions in the image that correspond to the map of the different mobile platform can include matching the features associated with the different mobile platform with one or more points in the map of the different mobile platform.

The process 1200 can also include anchoring virtual content to one or more features in a first map of the mobile platform and/or a second map of the environment outside of the mobile platform, and displaying the virtual content on one or more regions in the mobile platform and/or the environment outside of the mobile platform. In this example, the one or more regions can correspond to the one or more features in the first map of the mobile platform and/or the second map of the environment outside of the mobile platform. In some cases, the process 1200 can include obtaining additional sensor measurements from the plurality of sensors (130), and adapting a display location of the virtual content and/or a display configuration of the virtual content.

In some implementations, the process 1200 can include anchoring virtual content to one or more features in a first map of the mobile platform and/or a second map of the environment outside of the mobile platform, translating a motion associated with the mobile platform, the user, and/or the environment outside of the mobile platform into a virtual motion, and displaying the virtual content on one or more regions of the mobile platform and/or the environment outside of the mobile platform. The one or more regions can correspond to the one or more features in the first map of the mobile platform and/or the second map of the environment outside of the mobile platform. Moreover, the virtual content displayed can reflect the virtual motion translated from the motion associated with the mobile platform, the user, and/or the environment outside of the mobile platform. In some examples, the motion can be translated based on motion parameters, the pose of the user relative to the mobile platform and/or the environment outside of the mobile platform, and/or the pose of the mobile platform relative to the environment outside of the mobile platform and/or the user.

The additional sensor measurements can include, for example, a relative velocity associated with the mobile platform and/or user, a relative acceleration of the mobile platform and/or user, a trajectory of the mobile platform and/or user, an altitude of the mobile platform and/or user, a location of the mobile platform and/or user, a relative angular rate or velocity of the mobile platform and/or user, motion dynamics associated with the mobile platform and/or user, etc. Moreover, in some cases, the display location of the virtual content and/or the display configuration of the virtual content can be adapted based on the relative velocity associated with the mobile platform and/or user, a relative acceleration of the mobile platform and/or user, the trajectory of the mobile platform and/or user, the altitude of the mobile platform and/or user, the location of the mobile platform and/or user, the relative angular rate or velocity of the mobile platform and/or user, the motion dynamics associated with the mobile platform and/or user, etc.

In some implementations, the process 1200 can include displaying the virtual content within a virtual representation of one or more regions in the mobile platform and/or the environment outside of the mobile platform. Moreover, in some examples, the virtual content can include audio, a virtual image, a virtual video, digital content, a virtual game, interactive virtual content, a virtual content overlay, a virtual scene, a virtual simulation, a virtual object, a virtual web page, a virtual image of a browser, etc.

The process 1200 can also include tracking drift between one or more sensors mounted on a wearable device associated with the user (e.g., HMD 408) and one or more additional sensors mounted on the mobile platform based on image data captured by the one or more sensors mounted on the wearable device and/or the one or more additional sensors mounted on the mobile platform. The one or more sensors can be configured to detect features associated with the wearable device, and the one or more additional sensors can be configured to detect features associated with the mobile platform and the environment outside the mobile platform. In some examples, the features can include motion parameters and/or scene/object properties. In this example, the process 1200 can also include adjusting, based on the drift, one or more sensor biases associated with any of the plurality of sensors (130). The plurality of sensors (130) can include one or more sensors mounted on the wearable device and one or more additional sensors mounted on the mobile platform.

In some cases, tracking the first pose of the mobile platform relative to the environment outside of the mobile platform can include tracking the first pose of the mobile platform relative to a first map (e.g., a global map) of the environment outside of the mobile platform, and tracking the second pose of the user can include tracking the pose of the user relative to a second map of the mobile platform (e.g., a mobile map) and/or the first map of the environment outside of the mobile platform. Further, identifying features of the mobile platform and features of the environment outside of the mobile platform can include tracking a first set of features in a first map of the mobile platform (e.g., a mobile map) and a second set of features in a second map of the environment outside of the mobile platform (e.g., a global map).

In other examples, tracking the first pose of the mobile platform and tracking the second pose of the user can be based on a a velocity of the mobile platform relative to the environment outside of the mobile platform, an acceleration of the mobile platform relative to the environment outside of the mobile platform, a trajectory of the mobile platform, an altitude of the mobile platform, a location of the mobile platform, a position of the user, a motion of the user, and/or any other motion dynamics.

In some examples, the process 1200 may be performed by a computing device or an apparatus. In one illustrative example, the process 1200 can be performed by the virtual content processing system shown in FIG. 1 and/or a computing device with the computing device architecture 1300 shown in FIG. 13. In some cases, the computing device or apparatus may include a processor, microprocessor, microcomputer, or other component of a device that is configured to carry out the steps of process 1200. In some examples, the computing device or apparatus may include one or more sensors configured to collect sensor measurements. For example, the computing device can include a head-mounted display, a mobile device, or other suitable device. In some examples, the computing device or apparatus may include a camera configured to capture one or more images or videos. In some cases, the computing device may include a display for displaying images. In some examples, the one or more sensors and/or camera are separate from the computing device, in which case the computing device receives the sensor measurements. The computing device may further include a network interface configured to communicate data.

The process 1200 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 13 illustrates an example computing device architecture 1300 of an example computing device which can implement the various techniques described herein. For example, the computing device architecture 1300 can implement the virtual content processing system 102 shown in FIG. 1 and perform the tonal mapping techniques described herein. The components of the computing device architecture 1300 are shown in electrical communication with each other using a connection 1305, such as a bus. The example computing device architecture 1300 includes a processing unit (CPU or processor) 1310 and a computing device connection 1305 that couples various computing device components including the computing device memory 1315, such as read only memory (ROM) 1320 and random access memory (RAM) 1325, to the processor 1310.

The computing device architecture 1300 can include a cache of high-speed memory connected directly with, in close proximity to, or integrated as part of the processor 1310. The computing device architecture 1300 can copy data from the memory 1315 and/or the storage device 1330 to the cache 1312 for quick access by the processor 1310. In this way, the cache can provide a performance boost that avoids processor 1310 delays while waiting for data. These and other modules can control or be configured to control the processor 1310 to perform various actions. Other computing device memory 1315 may be available for use as well. The memory 1315 can include multiple different types of memory with different performance characteristics. The processor 1310 can include any general purpose processor and a hardware or software service, such as service 1 1332, service 2 1334, and service 3 1336 stored in storage device 1330, configured to control the processor 1310 as well as a special-purpose processor where software instructions are incorporated into the processor design. The processor 1310 may be a self-contained system, containing multiple cores or processors, a bus, memory controller, cache, etc. A multi-core processor may be symmetric or asymmetric.

To enable user interaction with the computing device architecture 1300, an input device 1345 can represent any number of input mechanisms, such as a microphone for speech, a touch-sensitive screen for gesture or graphical input, keyboard, mouse, motion input, speech and so forth. An output device 1335 can also be one or more of a number of output mechanisms known to those of skill in the art, such as a display, projector, television, speaker device, etc. In some instances, multimodal computing devices can enable a user to provide multiple types of input to communicate with the computing device architecture 1300. The communications interface 1340 can generally govern and manage the user input and computing device output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof. The storage device 1330 can include services 1332, 1334, 1336 for controlling the processor 1310. Other hardware or software modules are contemplated. The storage device 1330 can be connected to the computing device connection 1305. In one aspect, a hardware module that performs a particular function can include the software component stored in a computer-readable medium in connection with the necessary hardware components, such as the processor 1310, connection 1305, output device 1335, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components, computing devices and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    obtaining sensor measurements from one or more sensors on at least one of a mobile platform and a device associated with a user in the mobile platform, the sensor measurements comprising motion parameters associated with the mobile platform and the user in the mobile platform;
    obtaining a mobile map of the mobile platform, the mobile map being obtained from a plurality of mobile maps maintained for a plurality of mobile platforms;
    identifying features associated with the mobile map of the mobile platform and features associated with a global map of an environment outside of the mobile platform;

tracking, using the sensor measurements, a first pose of the mobile platform relative to at least one feature of the features associated with the global map of the environment outside of the mobile platform;

tracking, using the sensor measurements, a second pose of the user relative to at least one feature of the features associated with the mobile map of the mobile platform;

tracking, based on the first pose and the second pose, a third pose of the user relative to at least one of the features associated with the global map of the environment outside of the mobile platform; and displaying content with respect to the mobile map based on tracking the third pose of the user.

2. The method of claim 1, further comprising:

detecting, using an environment classifier and image data captured by at least one of the one or more sensors, that the user has entered a different mobile platform;

identifying additional features associated with the different mobile platform; and tracking an additional pose of the user relative to the additional features associated with the different mobile platform.

3. The method of claim 2, wherein detecting that the user has entered the different mobile platform comprises:

receiving an image of a current environment associated with the user;

partitioning, using an image segmentation algorithm, the image into multiple image segments; and based on the multiple image segments, identifying one or more regions in the image that correspond to a map of the different mobile platform, the different mobile platform being associated with the current environment.

4. The method of claim 3, wherein identifying the one or more regions in the image that correspond to the map of the different mobile platform comprises matching the additional features associated with the different mobile platform with one or more points in the map of the different mobile platform.

5. The method of claim 1, further comprising:

detecting that the user has exited the mobile platform based on an inconsistency between the sensor measurements and geometric constraints computed for the mobile platform, the geometric constraints being computed by tracking a subset of points in a map of the mobile platform.

6. The method of claim 1, further comprising:

determining whether the sensor measurements fit two or more maps associated with two or more mobile platforms;

when the sensor measurements fit the two or more maps associated with the two or more mobile platforms, determining that the global map of the environment outside of the mobile platform includes the two or more maps associated with the two or more mobile platforms; and storing, on the global map, an indication that the global map includes the two or more maps associated with the two or more mobile platforms.

7. The method of claim 1, further comprising:

anchoring virtual content to one or more features in at least one of the mobile map of the mobile platform and the global map of the environment outside of the mobile platform; and wherein displaying the content with respect to the mobile map includes displaying the virtual content on one or more regions in at least one of the mobile platform and the environment outside of the mobile platform, wherein the one or more regions correspond to the one or more features in the at least one of the mobile map of the mobile platform and the global map of the environment outside of the mobile platform.

8. The method of claim 7, further comprising:

obtaining additional sensor measurements from the one or more sensors, the additional sensor measurements comprising at least one of a relative velocity associated with the mobile platform, a relative acceleration of the mobile platform, a trajectory of the mobile platform, and an altitude of the mobile platform; and adapting at least one of a display location of the virtual content and a display configuration of the virtual content based on at least one of the relative velocity associated with the mobile platform, the relative acceleration of the mobile platform, the trajectory of the mobile platform, and the altitude of the mobile platform.

9. The method of claim 7, wherein displaying the content with respect to the mobile map includes displaying the virtual content within a virtual representation of the one or more regions in at least one of the mobile platform and the environment outside of the mobile platform, wherein the virtual content comprises at least one of audio, a virtual image, a virtual video, digital content, one or more virtual games, interactive virtual content, a virtual content overlay, a virtual scene, a virtual simulation, a virtual object, and a virtual web page.

10. The method of claim 1, further comprising:

tracking drift between a first sensor mounted on the device associated with the user and a second sensor mounted on the mobile platform, based on image data captured by at least one of the first sensor mounted on the device and the second sensor mounted on the mobile platform, the first sensor being configured to detect features associated with the device and the second sensor being configured to detect features associated with the mobile platform and the environment outside the mobile platform, the features comprising at least one of motion parameters and scene properties; and adjusting, based on the drift, one or more sensor biases associated with at least one of the one or more sensors, the one or more sensors comprising the first sensor mounted on the device and the second sensor mounted on the mobile platform.

11. The method of claim 1, wherein at least one sensor is mounted on the device associated with the user and at least one additional sensor is mounted on the mobile platform, the at least one sensor being configured to detect one or more features associated with the device and the at least one additional sensor being configured to detect one or more features associated with the mobile platform and the environment outside the mobile platform, the one or more features associated with the device and the one or more features associated with the mobile platform and the environment comprising at least one of motion parameters and scene properties.

12. The method of claim 1, wherein tracking the first pose of the mobile platform relative to the environment outside of the mobile platform comprises tracking the first pose of the mobile platform relative to a first map of the environment outside of the mobile platform, and wherein tracking the second pose of the user comprises tracking the second pose of the user relative to a second map of the mobile platform.

13. The method of claim 1, wherein identifying the features associated with the mobile map of the mobile platform and the features associated with the global map of the environment outside of the mobile platform comprises tracking a first set of features in a first map of the mobile platform and a second set of features in a second map of the environment outside of the mobile platform.

14. The method of claim 1, wherein the sensor measurements comprise at least one of a velocity of the mobile platform relative to the environment outside of the mobile platform, an acceleration of the mobile platform relative to the environment outside of the mobile platform, a trajectory of the mobile platform, an altitude of the mobile platform, a location of the mobile platform, a position of the user, and a motion of the user.

15. The method of claim 14, wherein tracking the first pose of the mobile platform and tracking the second pose of the user are based on at least one of the velocity of the mobile platform relative to the environment outside of the mobile platform, the acceleration of the mobile platform relative to the environment outside of the mobile platform, the trajectory of the mobile platform, the altitude of the mobile platform, the location of the mobile platform, the position of the user, and the motion of the user.

16. The method of claim 1, wherein the one or more sensors comprise at least one of inertial measurement units, one or more image sensors, one or more radars, an odometry device, and one or more lidars, and wherein the mobile platform comprises at least one of a vehicle, an elevator, an aircraft, a vessel, and a conveyance.

17. The method of claim 1, further comprising:
anchoring virtual content to one or more features in at least one of the mobile map of the mobile platform and the global map of the environment outside of the mobile platform; and
translating a motion associated with at least one of the mobile platform, the user, and the environment outside of the mobile platform into a virtual motion, the motion being translated based on at least one of the first pose, the second pose, the third pose and the motion parameters;
wherein displaying the content with respect to the mobile map includes displaying the virtual content on one or more regions of at least one of the mobile platform and the environment outside of the mobile platform, wherein the one or more regions correspond to the one or more features in the at least one of the mobile map of the mobile platform and the global map of the environment outside of the mobile platform, wherein at least a portion of the virtual content displayed reflects the virtual motion.

18. An apparatus comprising:
a memory; and
a processor coupled to the memory, the processor configured to:
obtain sensor measurements from one or more sensors on at least one of a mobile platform and a device associated with a user in the mobile platform, the sensor measurements comprising motion parameters associated with the mobile platform and the user in the mobile platform;
obtain a mobile map of the mobile platform, the mobile map being obtained from a plurality of mobile maps maintained for a plurality of mobile platforms;
identify features associated with the mobile map of the mobile platform and features associated with a global map of an environment outside of the mobile platform;
track, using the sensor measurements, a first pose of the mobile platform relative to at least one feature of the features associated with the global map of the environment outside of the mobile platform;
track, using the sensor measurements, a second pose of the user relative to at least one feature of the features associated with the mobile map of the mobile platform;
track, based on the first pose and the second pose, a third pose of the user relative to at least one of the features associated with the global map of the environment outside of the mobile platform; and
display content with respect to the mobile map based on tracking the third pose of the user.

19. The apparatus of claim 18, wherein the processor is configured to:
detect, using an environment classifier and image data captured by at least one of the one or more sensors, that the user has entered a different mobile platform;
identify additional features associated with the different mobile platform; and
track an additional pose of the user relative to the additional features associated with the different mobile platform.

20. The apparatus of claim 19, wherein detecting that the user has entered the different mobile platform comprises:
receiving an image of a current environment associated with the user;
partitioning, using an image segmentation algorithm, the image into multiple image segments; and
based on the multiple image segments, identifying one or more regions in the image that correspond to a map of the different mobile platform, the different mobile platform being associated with the current environment.

21. The apparatus of claim 20, wherein identifying one or more regions in the image that correspond to the map of the different mobile platform comprises matching the additional features associated with the different mobile platform with one or more points in the map of the different mobile platform.

22. The apparatus of claim 18, wherein the processor is configured to:
detect that the user has exited the mobile platform based on an inconsistency between the sensor measurements and geometric constraints computed for the mobile platform, the geometric constraints being computed by tracking a subset of points in a map of the mobile platform.

23. The apparatus of claim 18, wherein the processor is configured to:
determine whether the sensor measurements fit two or more maps associated with two or more mobile platforms;
when the sensor measurements fit the two or more maps associated with the two or more mobile platforms, determine that the global map of the environment outside of the mobile platform includes the two or more maps associated with the two or more mobile platforms; and
store, on the global map, an indication that the global map includes the two or more maps associated with the two or more mobile platforms.

24. The apparatus of claim 18, wherein the processor is configured to:
  anchor virtual content to one or more features in at least one of the mobile map of the mobile platform and the global map of the environment outside of the mobile platform; and
  wherein displaying the content with respect to the mobile map includes displaying the virtual content on one or more regions in at least one of the mobile platform and the environment outside of the mobile platform, wherein the one or more regions correspond to the one or more features in the at least one of the mobile map of the mobile platform and the global map of the environment outside of the mobile platform, and wherein the virtual content comprises at least one of audio, a virtual image, a virtual video, digital content, one or more virtual games, interactive virtual content, a virtual content overlay, a virtual scene, a virtual simulation, a virtual object, and a virtual web page.

25. The apparatus of claim 24, wherein the processor is configured to:
  obtain additional sensor measurements from the one or more sensors, the additional sensor measurements comprising at least one of a relative velocity associated with the mobile platform, a relative acceleration of the mobile platform, a trajectory of the mobile platform, and an altitude of the mobile platform; and
  adapt at least one of a display location of the virtual content and a display configuration of the virtual content based on at least one of the relative velocity associated with the mobile platform, the relative acceleration of the mobile platform, the trajectory of the mobile platform, and the altitude of the mobile platform.

26. The apparatus of claim 18, wherein the processor is configured to:
  track drift between a first sensor mounted on the device associated with the user and a second sensor mounted on the mobile platform, based on image data captured by at least one of the first sensor mounted on the device and the second sensor mounted on the mobile platform, the first sensor being configured to detect features associated with the device and the second sensor being configured to detect features associated with the mobile platform and the environment outside the mobile platform, the features comprising at least one of motion parameters and scene properties; and
  adjust, based on the drift, one or more sensor biases associated with at least one of the one or more sensors, the one or more sensors comprising the first sensor mounted on the device and the second sensor mounted on the mobile platform.

27. The apparatus of claim 18, wherein the one or more sensors comprise at least one of an inertial measurement unit, an image sensor, a radar, an odometry device, and a lidar, wherein the mobile platform comprises at least one of a vehicle, an elevator, an aircraft, a vessel, and a conveyance, and wherein at least one sensor is mounted on the device associated with the user and at least one additional sensor is mounted on the mobile platform, the at least one sensor being configured to detect one or more features associated with the device and the at least one additional sensor being configured to detect one or more features associated with the mobile platform and the environment outside the mobile platform, the one or more features associated with the device and the one or more features associated with the mobile platform and the environment comprising at least one of motion parameters and scene properties.

28. The apparatus of claim 18, wherein the processor is configured to:
  anchor virtual content to one or more features in at least one of the mobile map of the mobile platform and the global map of the environment outside of the mobile platform; and
  translate a motion associated with at least one of the mobile platform, the user, and the environment outside of the mobile platform into a virtual motion, the motion being translated based on at least one of the first pose, the second pose, the third pose and the motion parameters;
  wherein displaying the content with respect to the mobile map includes displaying the virtual content on one or more regions of at least one of the mobile platform and the environment outside of the mobile platform, wherein the one or more regions correspond to the one or more features in the at least one of the mobile map of the mobile platform and the global map of the environment outside of the mobile platform, wherein at least a portion of the virtual content displayed reflects the virtual motion.

29. The apparatus of claim 18, further comprising the one or more sensors.

30. A non-transitory computer-readable storage medium comprising instructions stored thereon which, when executed by one or more processors, cause the one or more processors to:
  obtain sensor measurements from one or more sensors on at least one of a mobile platform and a device associated with a user in the mobile platform, the sensor measurements comprising motion parameters associated with the mobile platform and the user in the mobile platform;
  obtain a mobile map of the mobile platform, the mobile map being obtained from a plurality of mobile maps maintained for a plurality of mobile platforms;
  identify features associated with the mobile map of the mobile platform and features associated with a global map of an environment outside of the mobile platform;
  track, using the sensor measurements, a first pose of the mobile platform relative to at least one feature of the features associated with the global map of the environment outside of the mobile platform;
  track, using the sensor measurements, a second pose of the user relative to at least one feature of the features associated with the mobile map of the mobile platform;
  track, based on the first pose and the second pose, a third pose of the user relative to at least one of the features associated with the global map of the environment outside of the mobile platform; and
  display content with respect to the mobile map based on tracking the third pose of the user.

* * * * *